US006883704B2

(12) United States Patent
Abe et al.

(10) Patent No.: US 6,883,704 B2
(45) Date of Patent: Apr. 26, 2005

(54) BANK NOTE DISPENSING DEVICE WITH RECYCLING CAPABILITY

(75) Inventors: Hiroshi Abe, Iwatsuki (JP); Joji Iida, Hachiouji (JP)

(73) Assignee: Asahi Seiko Co., Ltd., Tokyo (JP)

(*) Notice: Subject to any disclaimer, the term of this patent is extended or adjusted under 35 U.S.C. 154(b) by 134 days.

(21) Appl. No.: 10/234,622

(22) Filed: Sep. 4, 2002

(65) Prior Publication Data

US 2003/0057220 A1 Mar. 27, 2003

(30) Foreign Application Priority Data

Sep. 4, 2001 (JP) ....................................... 2001-267532

(51) Int. Cl.[7] ................................................ G06F 17/60
(52) U.S. Cl. ............................ 235/379; 902/16; 902/17
(58) Field of Search ........................ 235/379; 902/8–21; 705/43; 209/534

(56) References Cited

U.S. PATENT DOCUMENTS 4,020,972 A 5/1977 Lundblad
4,095,781 A * 6/1978 Kistner et al. ................ 271/12
4,726,474 A * 2/1988 Arikawa et al. ............ 209/534
4,739,156 A 4/1988 Watanabe
4,795,889 A 1/1989 Matuura et al.
6,068,101 A 5/2000 Dickenson et al.
6,098,837 A 8/2000 Izawa et al.
6,264,556 B1 7/2001 Izawa et al.
6,293,867 B1 9/2001 Heidel et al.
6,371,473 B1 4/2002 Saltsov et al.

* cited by examiner

*Primary Examiner*—Michael G. Lee
*Assistant Examiner*—Jamara A. Franklin

(57) ABSTRACT

A bank note dispensing device includes a storage unit which can store bank notes that can be dispensed to a user through a discharge opening. A monitor unit can be operatively positioned relative to a passageway for transporting the bank notes in order to determine any abnormal conditions, such as accidental discharge of duplicate bank notes. A diverting unit can be operatively connected to the monitoring unit to remove a bank note from the passageway when the monitoring unit indicates an abnormal condition. A second diverting unit can be activated to position a removed bank note in a reject storage container. A recycle unit can receive an abnormal designated bank note and provide a second passageway to return the abnormal designated bank note to a position for subsequent transportation by the transporting unit through the discharge opening.

22 Claims, 22 Drawing Sheets

BANK NOTE DISPENSING DEVICE WITH RECYCLING CAPABILITY

BACKGROUND OF THE INVENTION

1. Field of the Invention

This present invention is an improvement in a compact bank note dispensing device which can dispense a bank note from a safe to a dispensing slot. More particularly, the present invention relates to a bank note dispensing device which can monitor the dispensing of each bank note and can capture and recycle any extra bank notes that had been accidentally forwarded for dispensing.

2. Description of Related Art

Compact bank note dispensing device are known as shown in U.S. Pat. No. 6,098,837. The term Bank note which is used in this specification embraces a check, a certificate, coupon ticket or exchange ticket, and other documents shaped like a bank note and can be stored in a stack-like manner. The prior art discloses a safe which has a bank note rejection section which can be detachable to present the loss of bank notes. When a sensor detects that there is an erroneous duplication of bank notes, the duplicated bank note is usually guided to the reject section and isn't dispensed.

However, if a substantial number of duplicated bank notes are rejected and stored in the rejection section, the supply of bank notes will run out quickly and the safe will have to be charged with new bank notes frequently.

OBJECTS AND SUMMARY OF THE INVENTION

A first purpose of the present invention is to recycle any transported duplicated bank notes which are initially rejected.

A second purpose of the present invention is to downsize a bank notes dispensing device which can recycle the duplicated bank notes.

The bank note dispensing device comprises a safe which stores bank notes and has a dispensing slot, a bank note let off device which is located in the safe, a transporting device which transports the bank notes to the dispensing slot, a checking device which checks the bank notes which are to be released from the safe, a diverting device which diverts to a recycling passageway bank notes based on a signal from the checking device, and a recycling device which transports the bank notes in the recycling passage back to the transporting device.

When the duplicated bank notes are dispensed from the safe, the bank notes are guided to the recycling passage by the diverting device. Afterwards the bank notes are recycled back to the safe or are dispensed to the dispensing slot, as a result, they are recycled. Therefore a frequent changing of the supply of bank notes for the safe is avoided.

In the present invention, a recycling device is desirable, because it includes a one by one let off device which positions the bank notes in the recycling passageway. The bank notes can be stored in the recycling passageway, and they are let off from the recycling device one by one. Therefore they are recycled back to the safe or are dispensed from the recycling passageway to the dispensing slot.

Also, in the present invention, the dispensing time can become faster, because the recycling bank note are stored in the recycling passageway adjacent the transport device until the bank notes are dispensed to the dispensing slot in predetermined numbers. A recycling device is desirable, because the recycling device has a receiving device which receives the bank notes in the recycling passageway. In this structure, when the recycling bank notes are returned to the safe, they can be dispensed to the dispensing slot again. Therefore the bank note dispensing device is small, because it can be a small return of the safe which is mounted in the dispensing device.

In this present invention, a checking device is desirable, because it checks if there is any doubling up of bank notes and the duplicated bank notes are transported by the diverting device, the recycling passage and the recycling device. The receiving device is desirable, because it includes a let off device, and a direction changing device which changes the transporting direction of the let off device.

In this structure, a part of the receiving device can be used as a part of the let off device. Therefore the device uses fewer parts, which are smaller and inexpensive.

In this present invention, the recycling passageway is desirable, because it is located between the transporting device and the safe. In this structure, the transporting device and the recycling device can be located in a narrow space. Therefore the bank note dispensing device requires only a small area.

The recycling device is desirable, because it includes a lifting device which separates the bank notes from a bottom board of the safe. In this structure, when the bank note is received in the recycling passage, the lowest bank note is separated from the bottom by the lifting device.

DETAILED DESCRIPTION OF THE PREFERRED EMBODIMENTS

The following description is provided to enable any person skilled in the art to make and use the invention and sets forth the best modes contemplated by the inventors of carrying out their invention.

Figure 1:
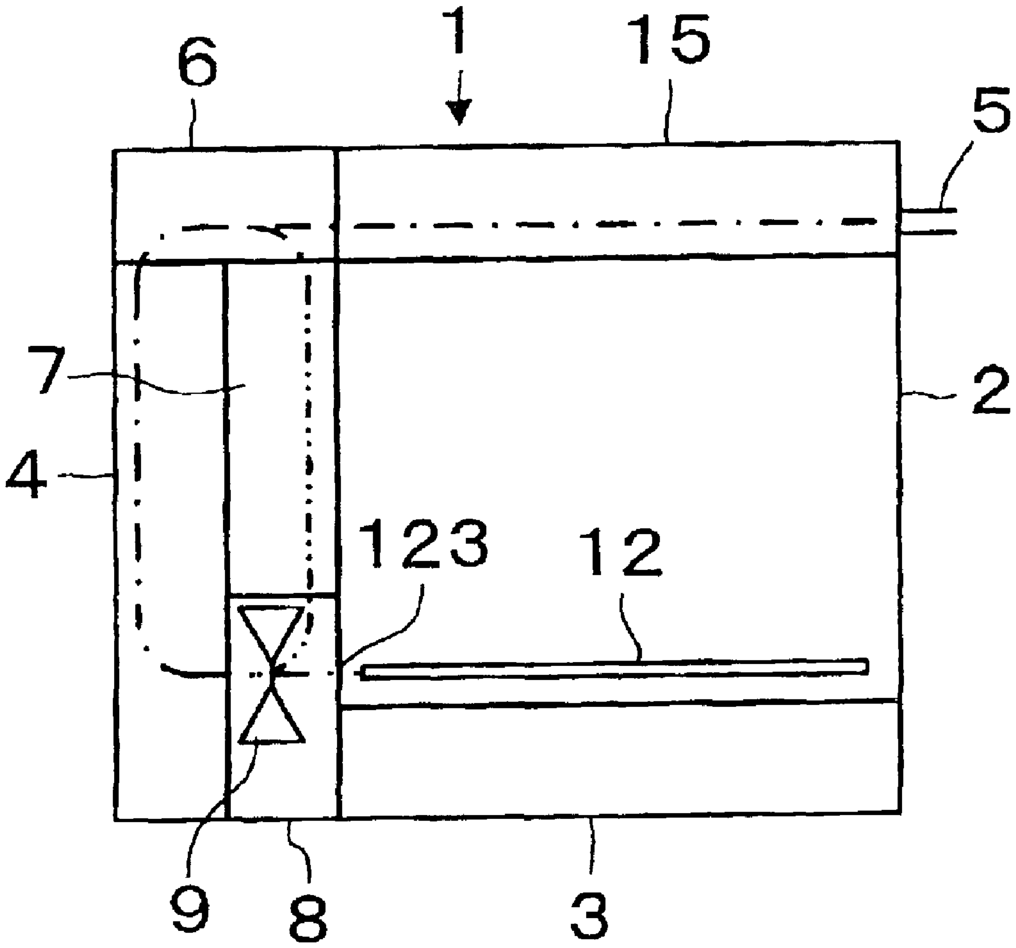
FIG. 1 is a schematic block diagram of the present invention.

As shown in FIG. 1, a compact bank note dispensing device 1 includes a safe 2 for bank notes, a let off device 3 for removing bank notes from the safe 2, a bank note transporting device 4, a bank note dispensing slot 5, a diverting device 6, a recycling passage 7, a recycling device 8 and a bank note checking device 9. Bank note dispensing device 1 is explained by referring to FIG. 2.

Safe 2 or storage unit has a shape of a compact box and is placed at a storing section 11 of the body or housing member 10. The transporting device 4 transports bank notes 12 from the safe 2 to the dispensing slot 5. Transporting device 4 is made up of a first transporting device 14 which is located besides storing section 11 and a second transporting device 15 which is located over the storing section 11.

The first transporting device 14 transports a bank note 12 upwards in a vertical direction along the rear of body 10. Storing device 16 temporarily stores the bank notes 12 which are received from the first transporting device 14 and the bank notes 12 are held in a horizontal disposition. The recycling device 8 is located intermediately between storing section 11 and the first transporting device 14 and vertically aligned relative to the first transporting device 14.

The diverting device 6 is located between the first transporting device 14 and the second transporting device 15 and can divert selected bank notes 12 to second transporting device 15 or to the recycling passage 7. The let off device 3 of bank notes 12 is located in safe 2 and is driven by the driving device 17 which is located in the body 10.

Figure 2:
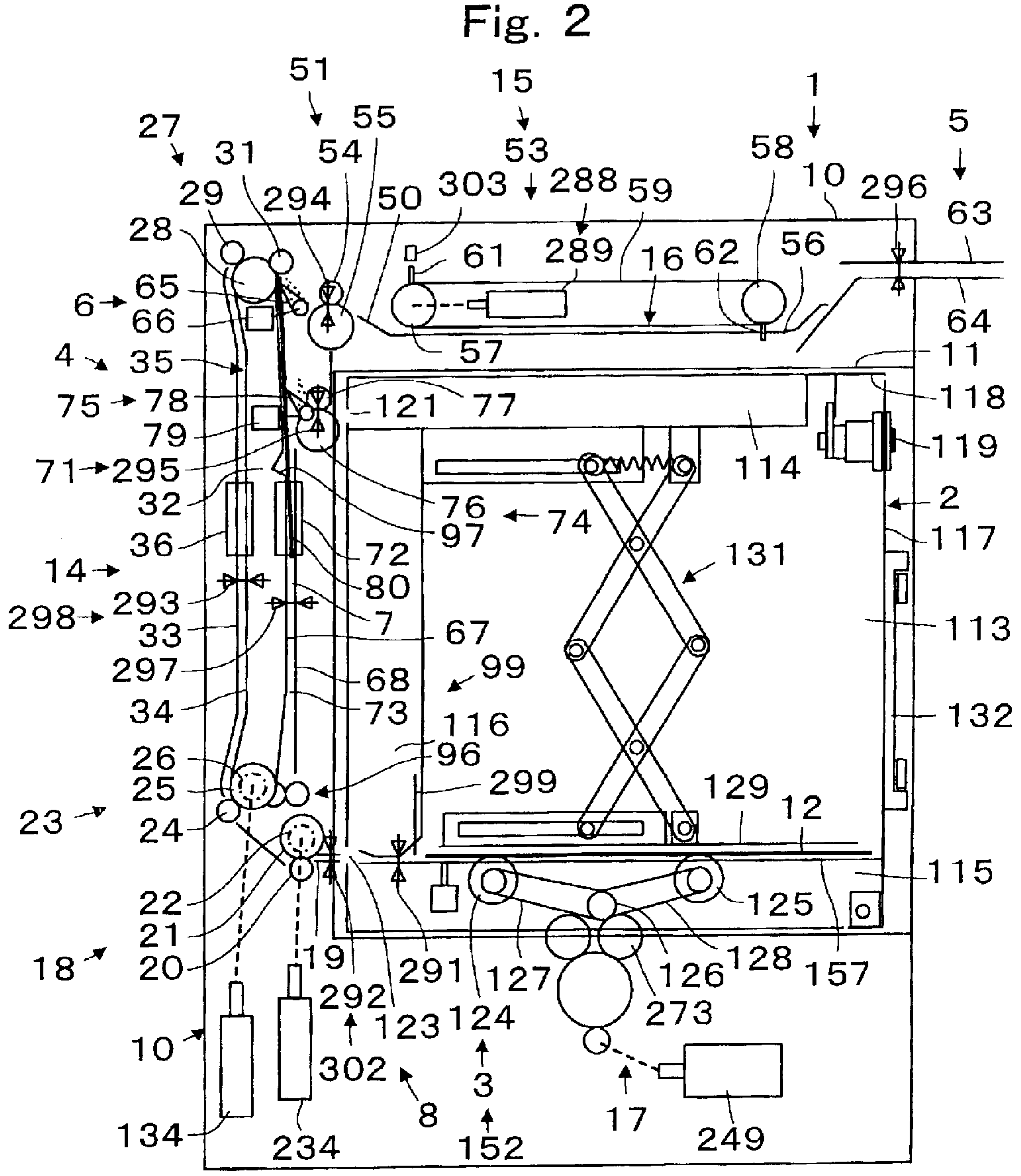
FIG. 2 is a side elevated schematic of the bank note dispensing device.
Figure 3:
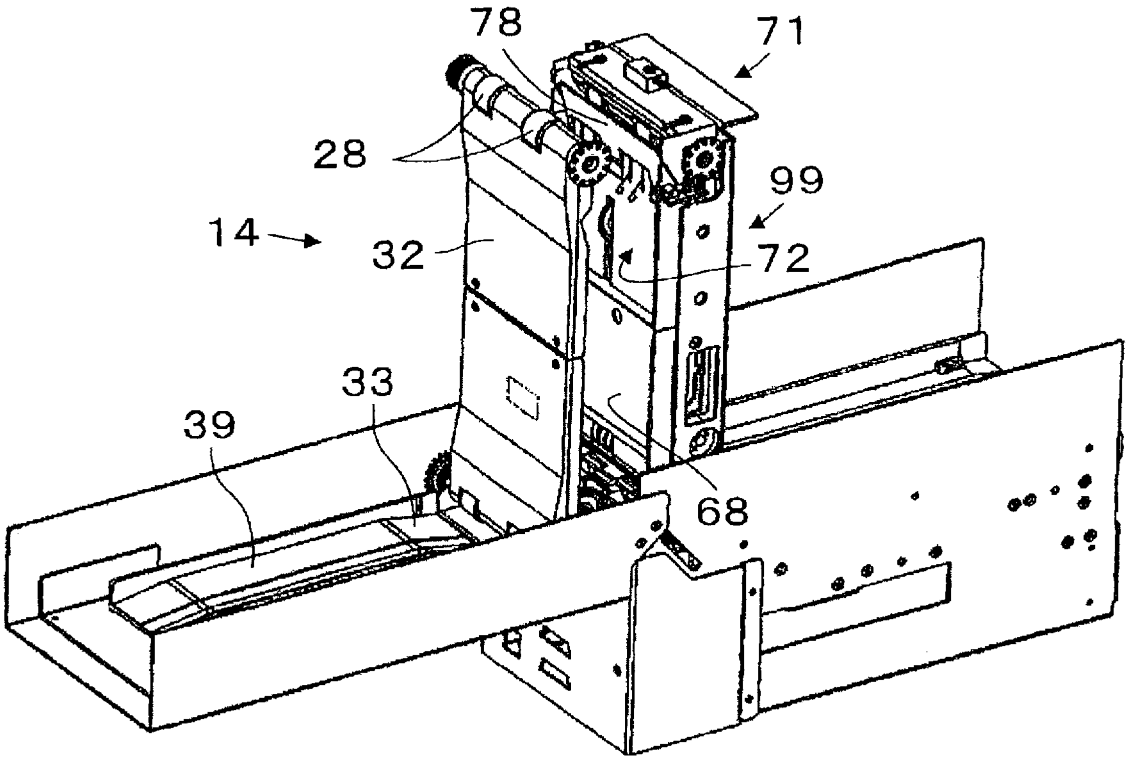
FIG. 3 is a perspective side view of the first transporting device.
Figure 4:
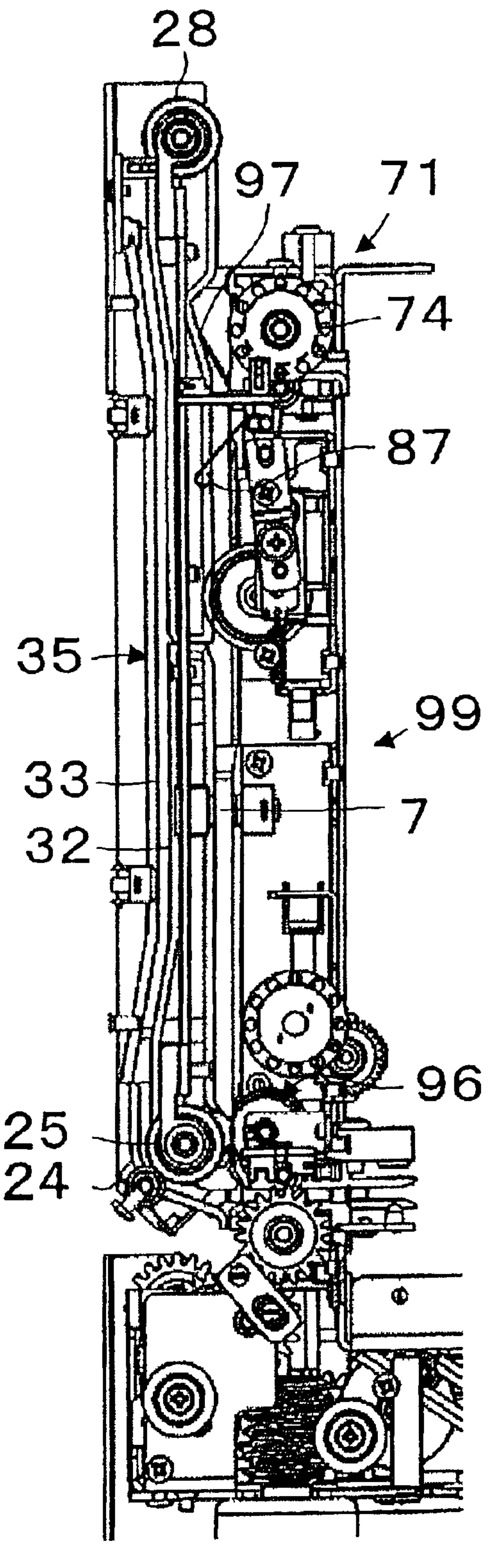
FIG. 4 is a side view of the transporting device.

First transporting device 14 is further explained by referring to FIG. 2 through FIG. 4. A first transporting roller system 18 is located adjacent to a receiving slot 19 at the lower left side of the storing section 11 in FIG. 2. A first press roller 20 of first transporting roller system 18 has a small diameter and is resiliently pressed against the first roller 21 which has a larger diameter. First gear 22 is fixed at the side surface of first roller 21.

A second transporting roller system 23 is located above the first transporting roller 18 on one side. A second press roller 24 in the second transporting roller system 23 resiliently contacts a second roller 25. Second gear 26 is fixed at the side surface of the second roller 25.

A third transporting roller section 27 is located over the second transporting roller system 23 and is located above the storing section 11 on the upper left side section of FIG. 2. The third transporting roller 27 includes a third roller 28 which has a large diameter, third press roller 29 which contacts with the upper section of the center of third roller 28 and a fourth press roller 31.

Figure 5:
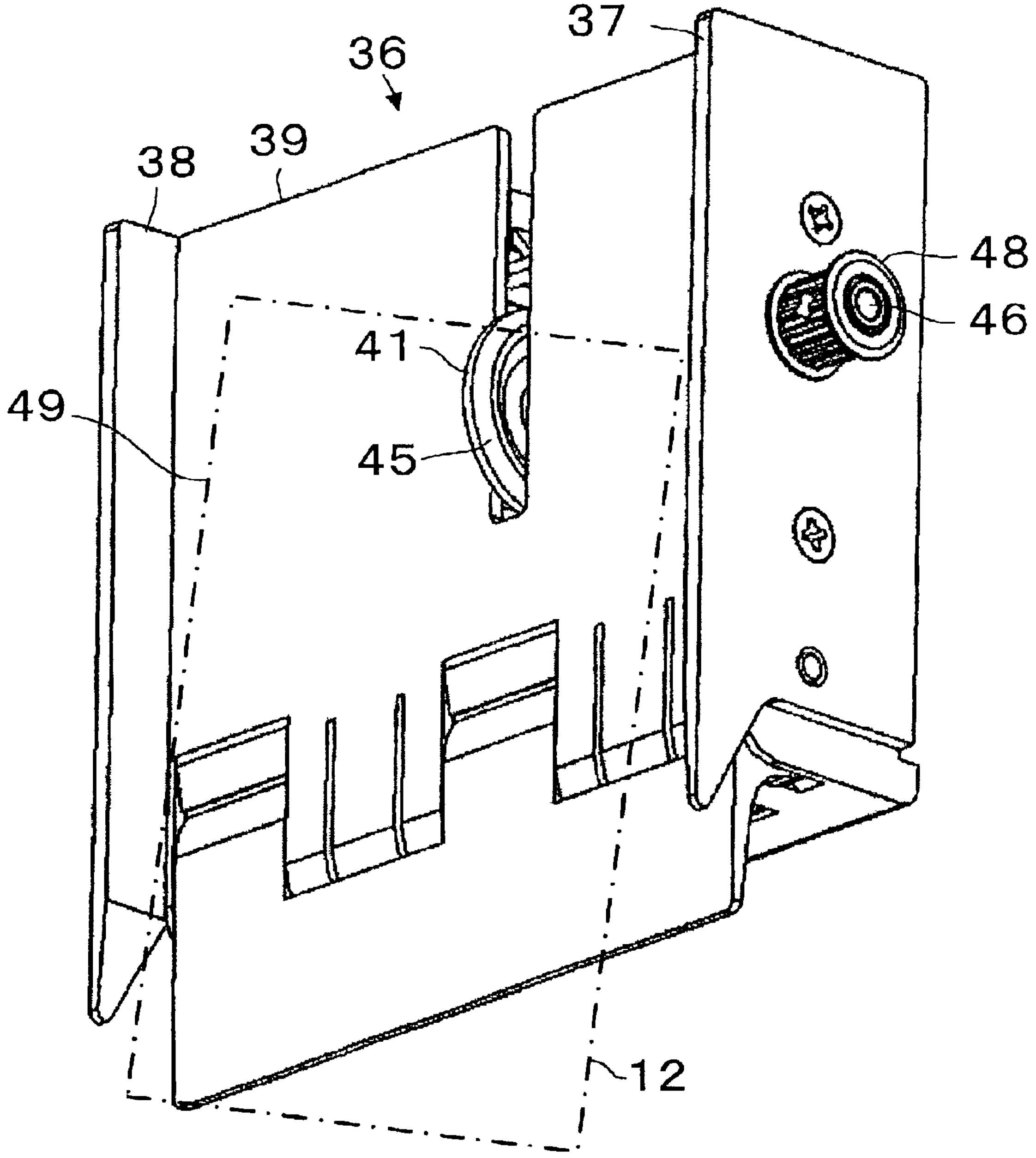
FIG. 5 is a side perspective view of the first arraying device.

A first guiding board 32 is located between the second roller 25 and the third roller 28. A second guide board 33 is plate like in shape and is located at a predetermined position which is away from the first guiding board 34. A first transporting passage 35 is located between the first guide board 34 and the second guiding board 33. A first arraying device 36 is located at the middle section of first transporting passage 35. As shown in FIG. 5, first arraying device 36 has a second guide wall 37 and a third guide wall 38 which are both located at a first guide wall 39 which is located adjacent to the first guiding board 34. Each guide wall is a plain plate. First guide wall 39 forms a part of a structure of the second guide board 33. The first arraying device 36 is rotatable and is supported at the first guiding board 34 which is between second guide wall 37 and third guide wall 38.

Figure 6:
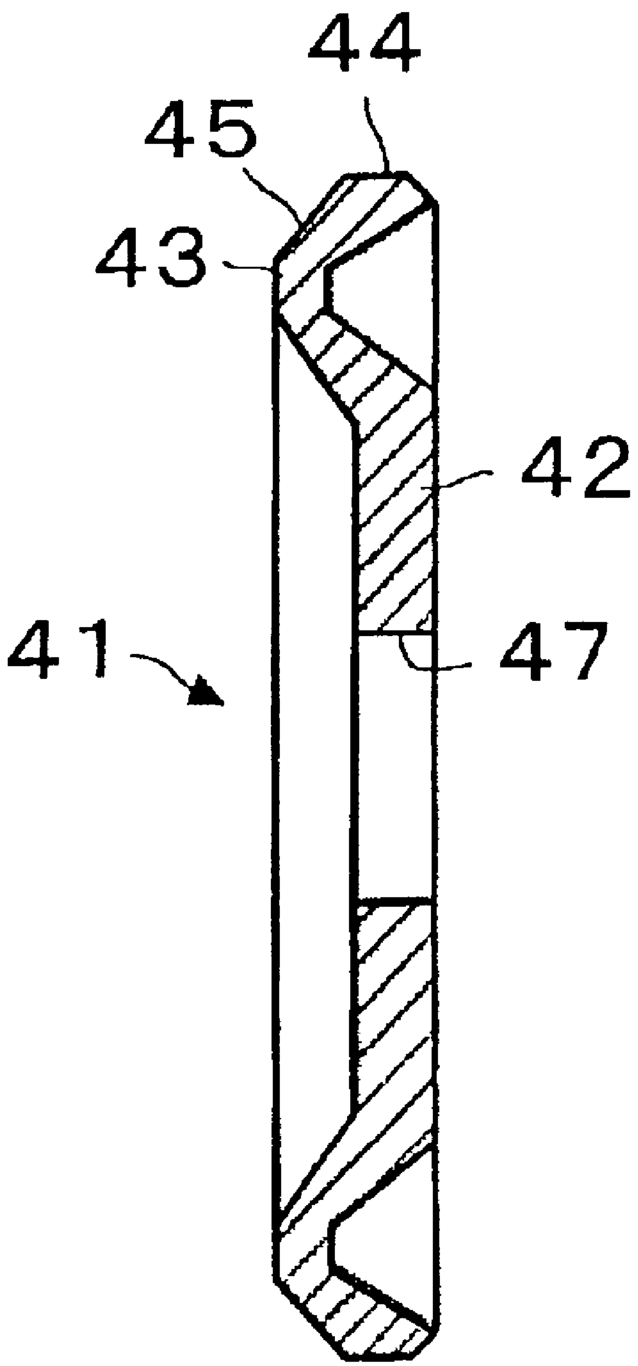
FIG. 6 is a cross sectional view of a first arraying roller.

As shown in FIG. 6, first arraying roller 41 has a circular plain section 42 and a V cross section 43 which is located around the circular plain section 42. The V cross section 43 has a cylindrical section 44 which is parallel to the rotating axe and also a slanting section 45. The first arraying roller 41 is made from an elastic polyurethane and is fixed at a rotating shaft 46 which penetrates supporting hole 47.

A timing pulley 48 is fixed at the end of a rotating shaft 46. Timing pulley 48 is driven through a belt (not shown) by a driving source. First arraying roller 41 is pressed to first guiding board 34. Therefore cylindrical section 44 and slanting section 45 are transformed and have contact with bank notes 12. The tangential rotating speed of cylindrical section 44 is relatively larger than the speed of slanting section 45 to transform the first arraying roller 41. Therefore the lower edge of bank note 12 is pressed to the third guide wall 38 because bank note 12 rotates in a clockwise direction as shown in FIG. 5. Subsequently, the side edge of bank note 12 will contact with the third guide wall 38, and as a result, it is arrayed along third guide wall 38.

Next, second transporting device 15 is explained by referring to FIG. 2. The second transporting device 15 includes a fourth transporting roller 51, a second storing device 52 and a package dispensing device 53. Fourth transporting roller system 51 is located above the storing section 11 and to the right and above the first transporting device 18. Fifth press roller 54 of fourth transporting roller 51 has resilient contact with fourth roller 55.

Next second storing device 52 is explained. Tray 50 is located above storing section 11 and to the right of fourth transporting roller 51 as shown in FIG. 2. Tray 50 is dish like in shape and has a hollow section 56 at the center. The length of the hollow 56 is longer than the bank note 12 to be dispensed. Bank notes 12 can be temporarily stored at the hollow section 56.

Next package dispensing device 53 is explained. A pair of guiding rollers 57 and 58 are located above and spaced away from the tray 56. The first belt 59 is wrapped around the guide rollers 57 and 58.

First projection member 61 and second projection member 62 are fixed along the outer surface of first belt 59. The distance between projections 61 and 62 is the same. The lower surface of the first belt 59 is parallel to hollow section 56 of tray 50.

Next, bank note dispensing slot 5 is explained. Guiding boards 63 and 64 are located over the storing section 11 and to the right of second transporting device 15 in FIG. 2, and spaced a predetermined distance from each other. There left ends are formed into a V shape.

Next, first diverting device 6 is explained. First diverting device 6 is located between third transporting roller systems 27 and fourth transporting roller system 51 and includes a diverting board 65 and a first solenoid 66 which rotates the diverting board 65. When the first solenoid 66 is demagnetized, bank notes 12 are guided to the recycling passage 7 by the diverting board 65. However, when the first solenoid 66 is excited, bank notes 12 are guided to the fourth transporting roller system 51.

Next, recycling passage 7 is explained. Recycling passage 7 includes first guiding board reverse side 67 and third guiding board 68 which is located predetermined distance away from the reverse side 67. Recycling passage 7 is vertically located between first transporting roller 18 and storing section 11. Rejecting device 71, second arraying device 72, recycle storing device 73 and recycling device 8 are located in recycling passage 7.

Next, rejecting device 71 is explained. Rejecting device 71 includes reject transporting roller 74 and a second diverting device or reject diverting device 75.

Reject transporting roller 74 is located between the upper section of storing section 11 and first transporting roller 18. Reject transporting roller 74 includes a sixth pressing roller 77 which has a small diameter which is in resilient contact with a fifth roller 76 having a large diameter.

Next, reject diverting device 75 includes reject guiding board 78 and second solenoid 79. Reject guiding board 78 is located between the first guiding board 32 and reject transporting roller 74. Recycling bank notes 80 are guided to reject transporting roller 74 or recycle storing device 73 by reject guiding board 78.

When a second solenoid 79 is not activated, reject guiding board 78 is located at first guiding board 32 side. Therefore a recycling bank note 80 is guided to reject transport roller 74. When the second solenoid 78 is excited, reject guiding board 78 moves and recycling bank note 80 is guided to recycle storing device 73.

Figure 7:
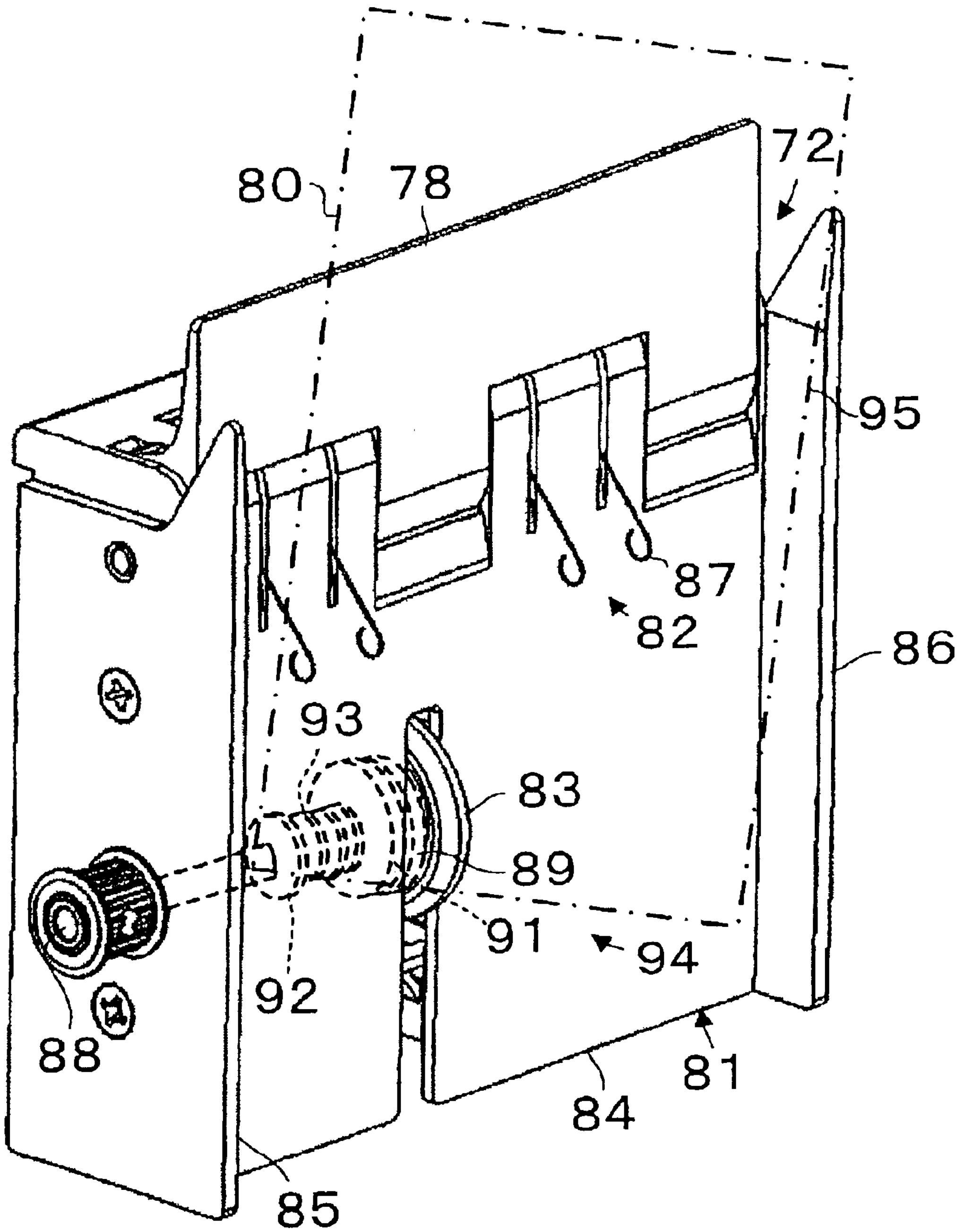
FIG. 7 is a front perspective view of a second arraying device.

Second arraying device 72 is explained referring to FIG. 7. Second arraying device 72 is approximately the same as first arraying device 36. Second arraying device 72 is located downstream of reject transporting roller 74. Reject guiding board 78 is mounted at the upper section of body 81 of second arraying device 72 and is rotatable. Second arraying device 72 includes a bias device 82, second arraying roller 83, first guiding wall 84, second guiding wall 85 and third guiding wall 86.

As shown in FIG. 7, bias device 82 has a ring like shape and can be formed from a wire spring 87 with the base fixed at body 81. The top of wire spring 87 is located at recycling passage 7. Wire spring 87 can be four in number and they are located at predetermined distances in a parallel arrangement.

Second arraying roller 83 is located at the downstream side of bias device 82 and is supported on a rotating shaft 88 and is the same shape as the first arraying roller 41. A first friction disc 89 is fixed on second arraying roller 83. Second friction disc 91 is located adjacent to friction disc 89 and is rotatable on rotating shaft 88. Second friction disc 91 is pushed to friction disc 89 by spring 93 which is located between stopper 92, which is fixed on rotating shaft 88, and first friction disc 89. Friction clutch 94 includes first friction disc 89 and second friction disc 91.

Rotating shaft 88 is rotated by a driving source (not shown). Recycling bank notes 80 are transported downwards and are pushed to the first guiding wall 84 and reverse surface 95 by wire spring 87 at the second arraying device 72. The side edge of recycling bank notes 80 is pushed to the third guiding wall 86 by the second arraying roller 83 of dispensing device 96, as a result, and they are transported.

When a recycling bank note 80 is stopped by the dispensing device 96, recycling bank note 80 has contact with second arraying roller 83. In this situation, recycling bank note 80 does not proceed forward, because when the friction force between the second arraying roller 83 and recycling bank note 80 is over a predetermined force, friction clutch 94 slips, as a result, second arraying roller 83 does not slip relative to recycling bank note 80. Slanting surface 97 is hollow and is located at the first guide board reverse surface 95. (shown in FIG. 4). Recycling bank notes 80 are guided to the base of spring 98 by slanting surface 97.

Recycling device 8 includes the dispensing device 96 and receiving device 99. Only one dispensing device 96 is explained referring to FIG. 8 and FIG. 9. Only one dispensing device 96 is located below recycling passage 7. It includes roller 101 which is fixed on shaft 100, a seventh pressing roller 102 has contact with roller 101 and fixed rollers 103 and 104 are larger in diameter than roller 101. Seventh pressing roller 102 is rotatable supported on shaft 105.

Figure 8:
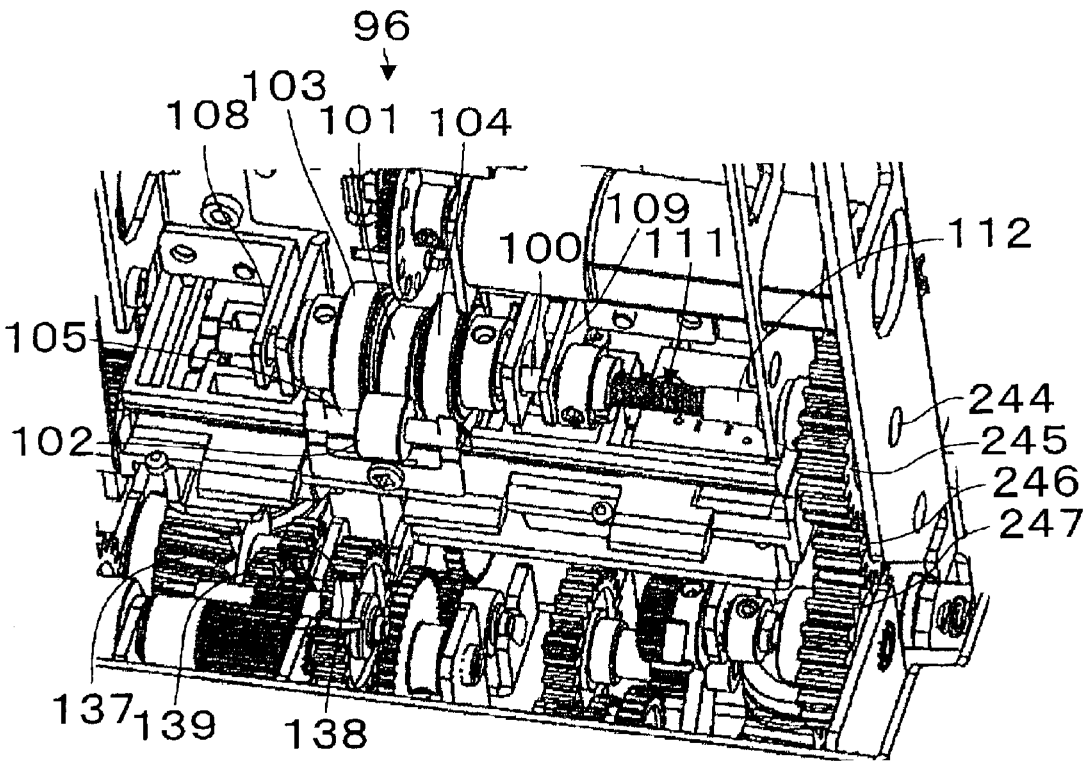
FIG. 8 is a perspective view of the let off device.

As shown in FIG. 8, fixed roller 103 and 104 are located 0.5 mm from the side of seventh press roller 102 and are eccentrically mounted relative to shaft 100. The round surface of roller 101 has contact with the round surface of the seventh press roller 102. The contact section 106 is located below overlap section 107 which overlaps on seventh press roller 102 and fixed rollers 103 and 104.

Recycling bank notes 80 are transported from second arraying device 72, and are stopped by overlap section 107. Shaft 100 is rotatable on shaft bearings 108 and 109. Shaft 100 is rotated through a one way clutch 111 by driving shaft 112.

Figure 10:
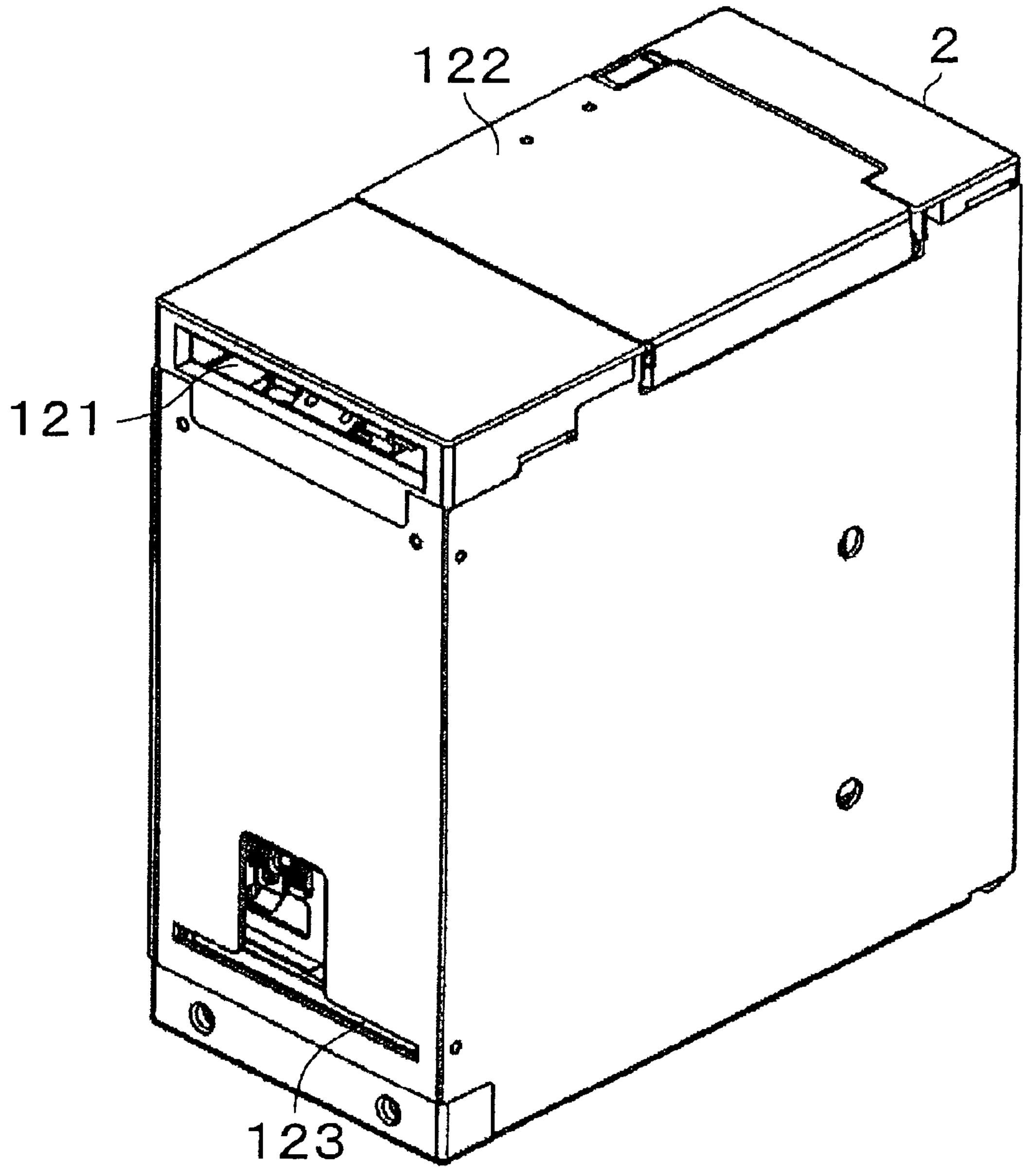
FIG. 10 is a front perspective view of the safe.

Safe 2 is explained referring to FIG. 2 and FIG. 10. Safe 10 has a storing section 113 which is located in the middle, a reject storing section 114 is located in the upper section, a unit section 115 is located under storing section 113, and a shutter section 116 is located at the side.

Lid 117 is hinged to frame 118 by key 119 and storing section 113 is opened or closed. Lid 117 is locked to safe 10 by key 119.

Reject storing section 114 is connected to a receiving slot 121 which is rectangle and is located at a horizontal extending section which is the nip section of reject transporting roller 74. As shown in FIG. 10, reject lid 122 is rectangle and is hinged over the upper section of reject storing section 114.

After reject lid 122 is opened, the reject bank notes are pulled out from reject storing section 114. Reject lid 122 can be locked by a locking device (not shown).

Bank note exit 123 is rectangle and is located below shutter section 116 and the side of the nipped plane of first transporting roller 18. Bank note exit 123 communicates with the storing section 113.

Referring to FIG. 2., let off device 3 is located in unit section 115 and includes rollers 124 and 125 which are located a predetermined distance along the longitudinal direction of bank note.

Pulleys (not shown) combined with driven gear 126 to rotate rollers 124 and 125 through belts 127 and 128. Driving device 17 drives driven gear 126.

Bank note pusher 129 is located in storing section 113 and is moved towards rollers 124 and 125 by parallel link mechanism 131. Handle 132 is supported at lid 117.

Figure 11:
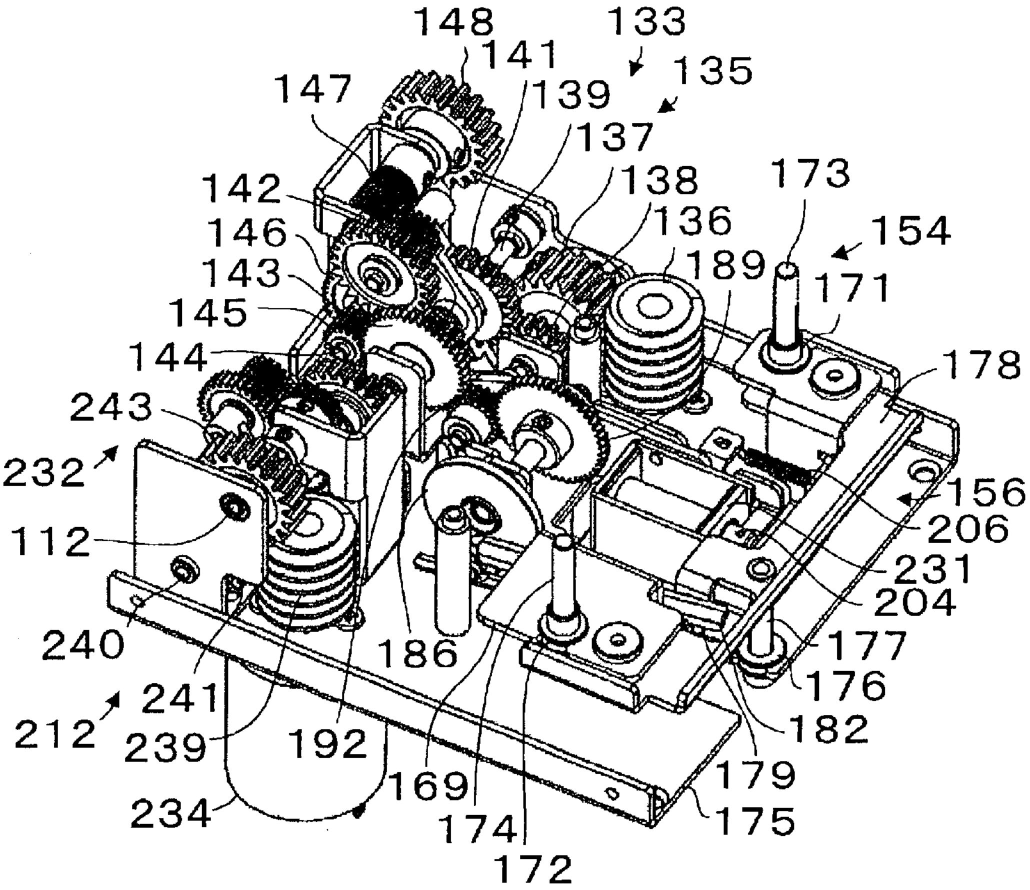
FIG. 11 is a perspective view of the driving mechanism of the bank note dispensing device.

Driving device 133 of first transporting roller 18 is explained referring to FIG. 11. First motor 134 drives second roller 25 through a first transmission mechanism 135. As shown in FIG. 11, worm gear 136 is fixed at the output shaft of first motor 134 and engages with worm wheel 137. Idling gear 138 is fixed at the output shaft which is fixed with worm gear 136 and engages with gear 141 which is fixed on shaft 139.

Gear 143 has contact with a torque slipping clutch 142 which is driven by shaft 139. Gear 143 engages with gear

145 which is rotatable on shaft 144. Gear 146 is fixed on the same shaft to gear 145 and engages with gear 147. Driving gear 148 is rotated and is coincident with gear 47.

Driving gear 148 engages with second gear 149 which is fixed on the same shaft as second roller 25. Therefore second roller 25 is rotated by first motor 134 wherein the torque range is established by a torque slipping clutch 142.

Second roller 25, fourth transporting roller 51 and fifth roller 76 are driven by second roller 25 through to the transmitting mechanism (not shown).

Receiving device 99 includes bank note lifter 151 and drawing device 152. Bank note lifter 151 is explained by referring to FIG. 11 through FIG. 13. Bank note lifter 151 includes a bank notes lifting device 153, lifting device 154 which drives lifting device 153, lifting driver 155 and driver 156.

Bank notes lifting device 153 is explained. First bracket 158 elongates downwards from the side of bottom 157. First lever 159 pivots on shaft 161 of first bracket 158. First pin 162 extends across to bank note 12 and is fixed at the top of first lever 159. First receiving section 163 is located in the middle of first lever 159 and extends towards the side.

Second lever 164 pivots on shaft 165 of second lever 164 and extends downward from the side of bottom 157. Second pin 166 extends towards first pin 162 and is fixed at the top of second lever 164. First pin 162 and second pin 166 are located on the same axis.

Second receiving section 168 is located below the middle of second lever 164 and extends towards the side. First lever 159 and second lever 164 has an applied torque force towards bottom 157 by a spring (not shown). At the standby situation, first pin 162 and second pin 166 are located below rollers 124 and 125.

When first lever 159 and second lever 164 move upwards, first pin 162 and second pin 166 push up the lowest bank note, and a triangle space is formed between bottom 157 and lowest bank note 12.

Bank notes lifting device 153 includes a lifting device 154 with a guide base 169 which is fixed at third bracket 175 in unit section 115, first pushing rod 173 which is slidable relative to bush 171 and 173 of guide base 169, second pushing rod 174 and guiding rod 177 which is cylindrical and is slidable relative to bush 176 of third bracket 175.

Figure 12:
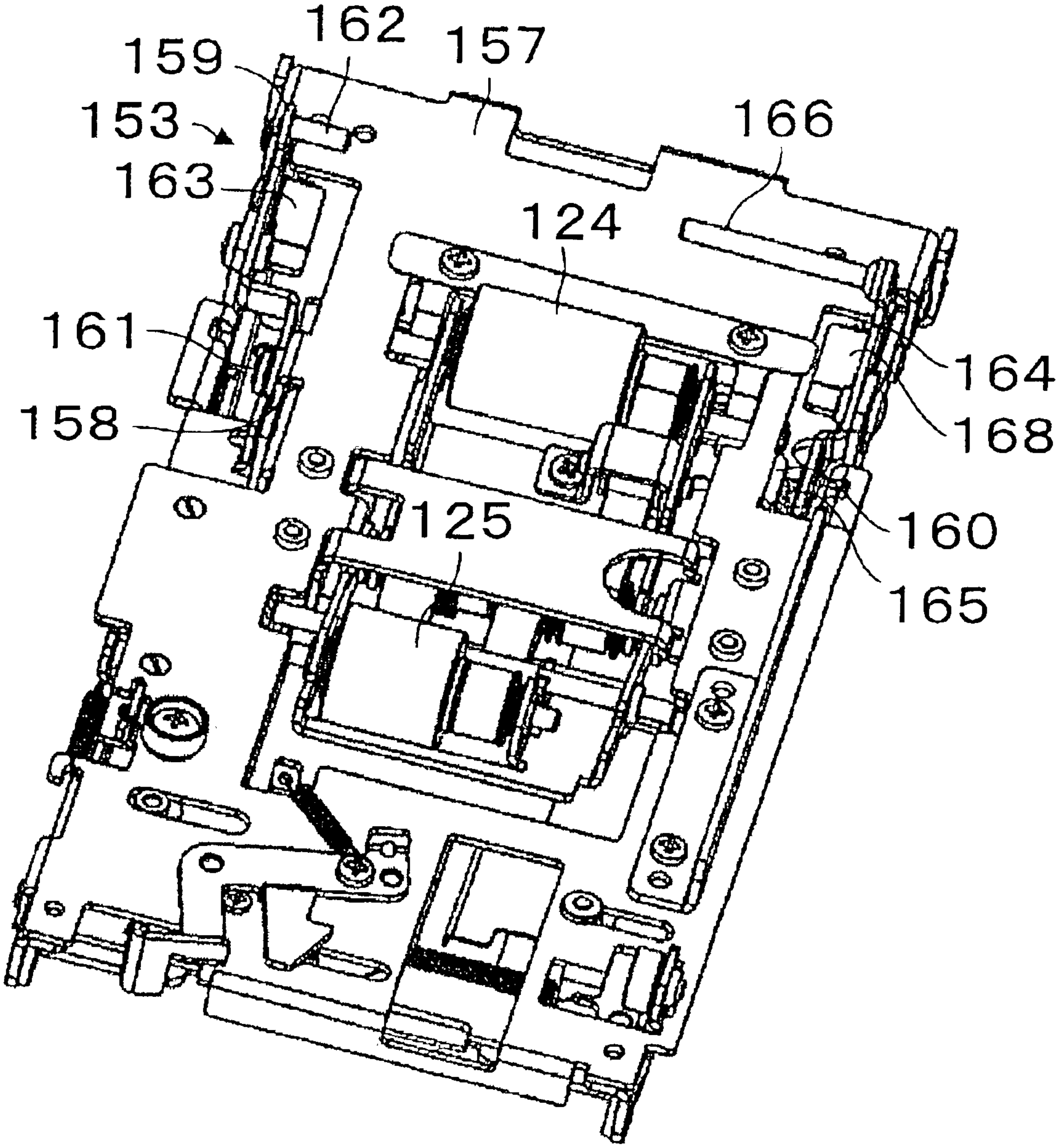
FIG. 12 is a perspective view of the lifting device.

The end of first pushing rod 173 is located opposite the under surface of second receiving section 168 (shown in FIG. 12). The end of second pushing rod 174 is located opposite the under surface of first receiving section 163 (shown in FIG. 12). The end of second pushing rod 174 pushes up first lever 159 and the end of first pushing rod 173 pushes up second lever 164. First pushing rod 173, second pushing rod 174 and guiding rod 177 are fixed at transferring base 178.

Figure 13:
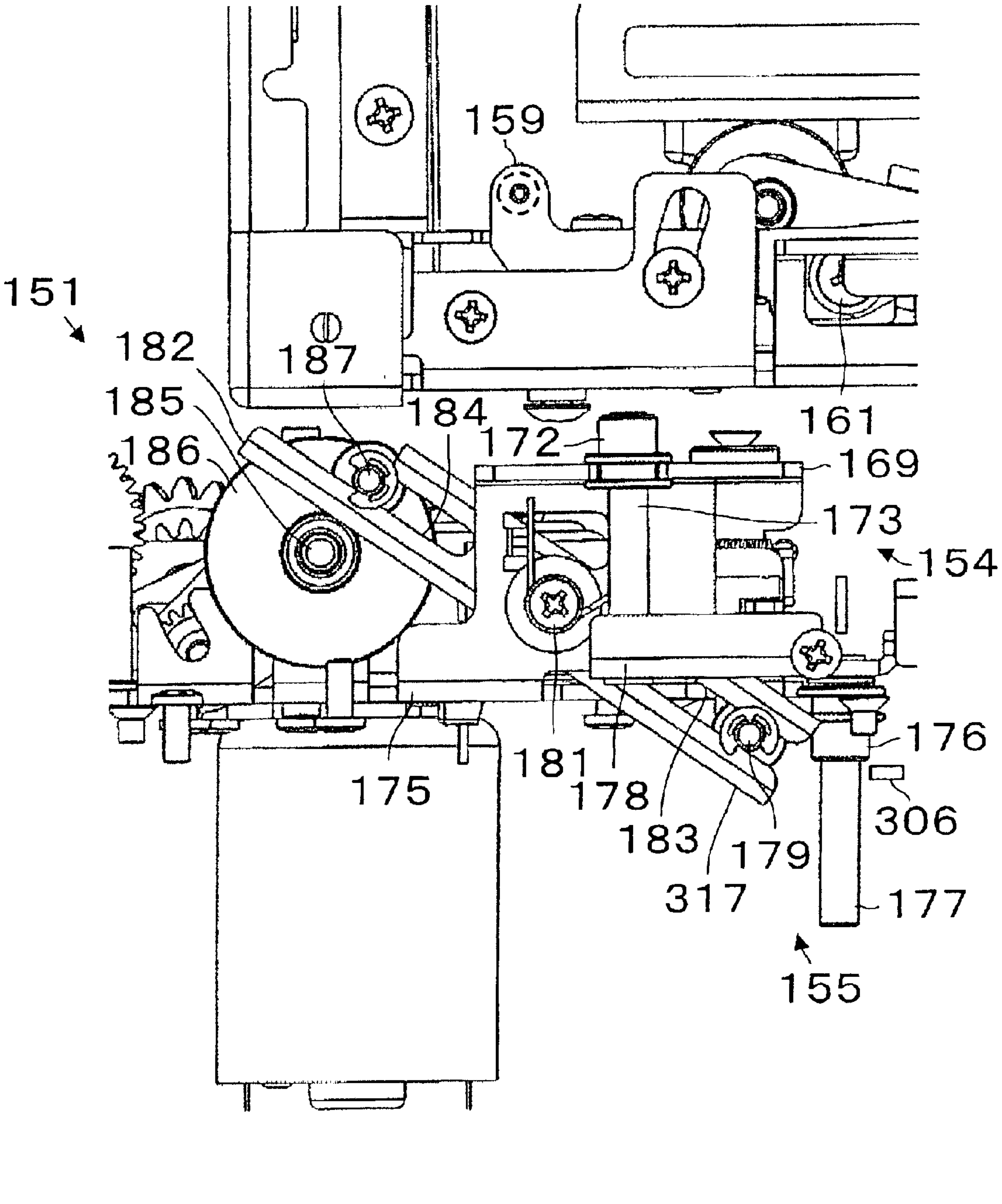
FIG. 13 is a front partial front view of a driving device for the lifting device.

Lifting device 154 of lifting driver 155 is explained. As shown in FIG. 13, pin 179 is fixed at transferring base 178. Shaft 181 is fixed at third bracket 175. Lever 182 pivots on shaft 181.

Pin 179 is inserted in groove 183 and is slideable. Pin 187 is fixed at crank 186 which is mounted on rotating shaft 185 and is inserted in groove 184 at the other end of lever 182.

Driver 156 of lifting driver 155 is explained. Driven gear 189 is fixed at rotating shaft 185. Rotating shaft 185 is rotatable supported at fourth bracket 191. Pinion gear 192 is fixed at shaft 193 and engages with driven gear 189. Shaft 193 penetrates elongated hole 193 in the vertical direction at fourth bracket 191.

Screws 198, 199 and 201 are screwed into the fourth bracket 191 and penetrate each elongate holes 195, 196 and 197.

Cam board 194 can slide along fourth bracket 191 by screws 198, 199 and 201 and elongated holes 195, 196 and 197.

Shaft 202 penetrates cam hole 203 which is crank like in shape and is located at the end of cam board 194. Cam hole 203 includes a horizontal section 205 and a slanting section 206.

Figure 14:
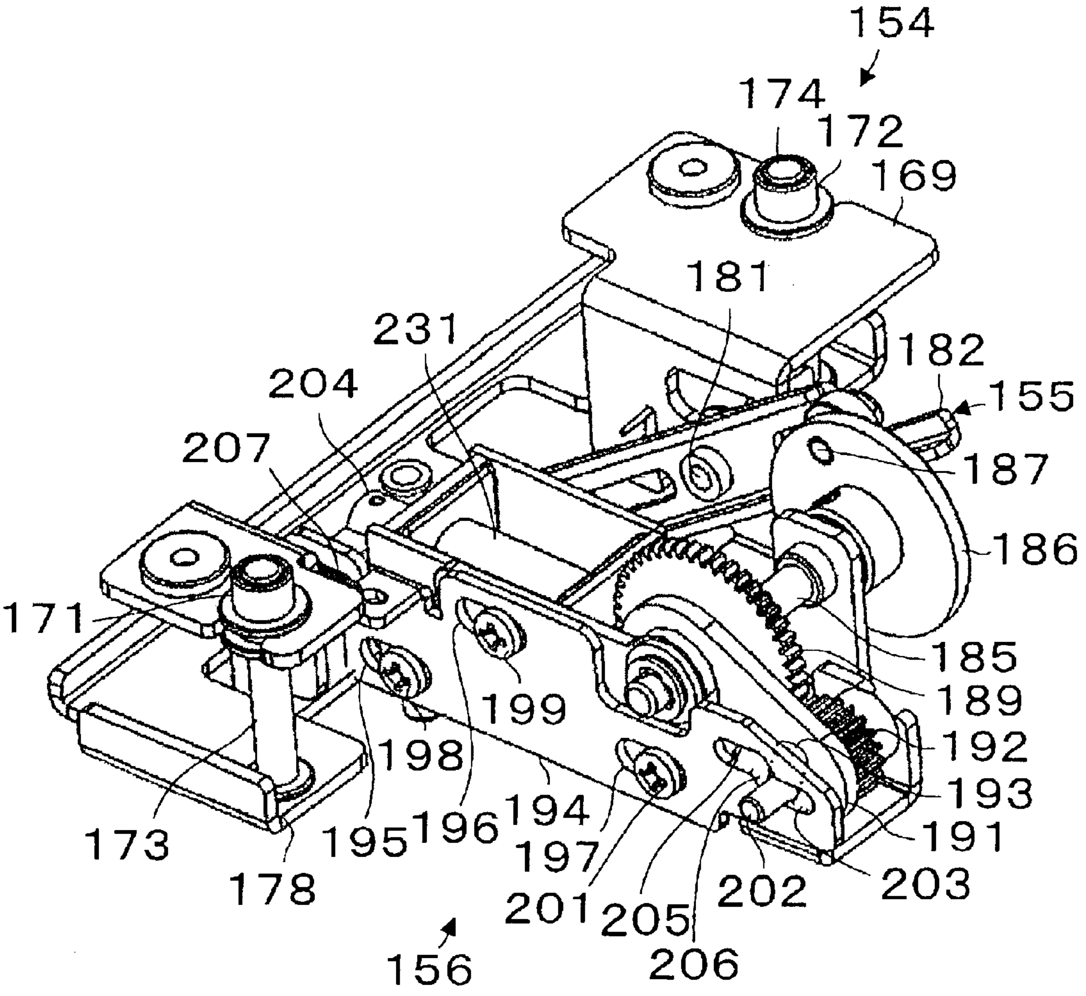
FIG. 14 is a perspective view of the lift driving device.

When slanting section 206 pushes shaft 202 towards the right shown in FIG. 14, pinion gear 192 engages with driving gear 227.

Third solenoid 231 is fixed at fourth bracket 191. Core 204 of third solenoid 231 is fixed at cam board 194. Cam board 194 is drawn towards the left shown in FIG. 14 by spring 207 which is hooked to fourth bracket 191.

When cam board 194 is drawn towards the left by spring 207, pinion gear 192 engages with driven gear 189 and does not engages with driving gear 227. (shown in FIG. 11)

When third solenoid 231 is activated, cam board 194 moves towards the right shown in FIG. 14. Therefore cam board 194 pushes up shaft 202 by slanting section 206. As a result, pinion gear 192 engages with driving gear 227. As shown in FIG. 11, driver 156 and first roller 21 is driven by first motor 134 through the first transmission mechanism 135.

Next, driving mechanism 232 of the one by one dispensing device 96 and first transporting roller 18 is explained. As shown in FIG. 11, second worm gear 239 is fixed at the output shaft of second motor 234 engages with a second worm wheel 241 which is rotatable supported on fixed shaft 240.

The gear (not shown) which is fixed at second worm wheel 241 engages with gear 243 which is fixed at driving shaft 112. Gear 243 engages with first gear 22 which is fixed at the side of first roller 21.

As shown in FIG. 8, gear 245 is fixed on shaft 244 of one by one dispensing device 96 and is driven by gear 247 through idle gear 246.

Therefore roller 101 of one by one dispensing device 96 is driven by second motor 234 through one way clutch 111.

Figure 15:
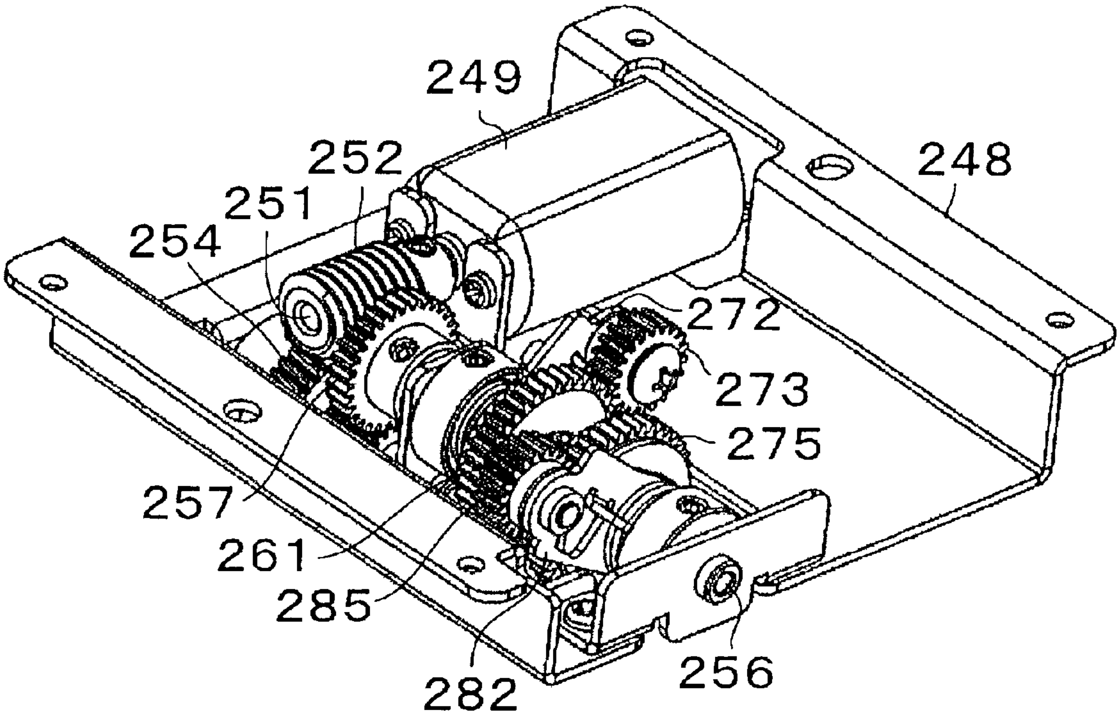
FIG. 15 is a perspective view of the driving device, the let off device and the receiving device.
Figure 16:
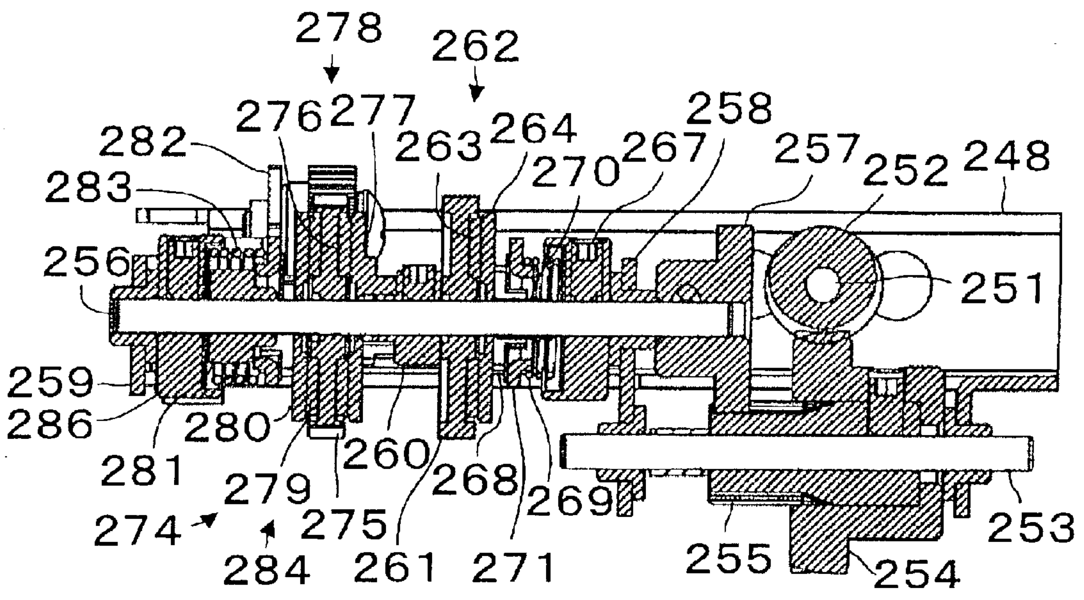
FIG. 16 is a cross sectional view of the driving device, the let off device and the receiving device.

Next, driving device 17 of let off device 3 is explained by referring to FIG. 15 and FIG. 16. Fourth motor 249 is fixed at bracket 248. Third worm gear 252 is fixed on the output shaft 25 of fourth motor 249.

Third worm gear 252 engages with the third worm wheel 254 which is fixed on shaft 253 which is rotatable supported at bracket 248. Pinion gear 255 is integrated with third worm gear 252 and engages with gear 257 which is fixed at shaft 256 which is also rotatable supported on bracket 248.

Second shaft 256 is rotatable supported on a pair of bearings 258 and 259. First stopper 260 is fixed in the middle of second shaft 256.

Drive gear 261 is fixed on second shaft 256 and is located adjacent to first stopper 260.

First slipping disc 263 is a ring and is fixed at the side of drive gear 261. Second slipping disc 264 is a ring and is rotatable supported at second shaft 256 and is located adjacent to first slipping disc 263.

The friction disc (not shown) is made of felt and is wedged between first slipping disc 263 and second slipping disc 264. First slipping clutch 262 is made up of first slipping disc 263, second slipping disc 264 and the friction disc.

First pusher 268 is a cylinder with a flange and is located between second stopper 267 and second slipping disc 264. Second stopper 267 is fixed on second shaft 256 which is located between bearing 258 and second slipping disc 264. Spring 269 is located between first pusher 268 and second stopper 267. Therefore second slipping disc 264 is pushed to first slipping disc 263 by spring 269.

Second spring 270 is wound around second shaft 256 which is a second one way clutch and comes face to face with first pusher 26. When second shaft 256 doesn't rotate, second spring 270 is rotatable about second shaft 256.

When second shaft 256 rotates in the involute direction of second spring 270, the inner surface of second spring 270 has a frictional contact with the exterior surface of second shaft 256. Therefore second spring 270 is caught on second shaft 256, as a result, the bore diameter of second spring 270 becomes smaller. Therefore second spring 270 has hard contact with second shaft 256 and rotates integral with second shaft 256.

Second slipping disc 264 rotates integral with second shaft 256 because the end of second spring 270 hooks to slit 271 of second slipping disc 264. The transmission force from second slipping disc 264 to first slipping disc 263 is determined by the pushing force of spring 269 and the coefficient of sliding friction between first slipping disc 263 and second slipping disc 264. Drive gear 261 engages with idle gear 273 and is rotatable supported on first cantilever 272 which is extended from first pusher 268.

Next drive changing device 274 is explained by referring to FIGS. 15 and 16. Drive changing device 274 includes receiving driving gear 275, second slipping clutch 278, second cantilever 282, third slipping clutch 284, and receiving idle gear 285. Third stopper 286 is fixed at second shaft 256 and is located adjacent to bearing 259. Receiving driving gear 275 is rotatable supported by second shaft 256 and is located between drive gear 261 and the third stopper 286.

Second slipping clutch 278 includes a third slipping disc 276 which is rotatable supported at the side of receiving driving gear 275. Fourth slipping disc 277 is rotatable supported on second shaft 256 and is located between the first stopper 260 and the third slipping disc 276.

A second friction disc (not shown) is a ring and is made of felt and is wedged between third slipping disc 276 and fourth slipping disc 277. Second slipping clutch 278 includes third slipping disc 276, fourth slipping disc 277 and the friction disc.

Third slipping clutch 284 is explained. Fifth slipping disc 279 is fixed at the side of receiving driving gear 275. Sixth disc 280 is rotatable supported on second shaft 256 and is located between third stopper 286 and fifth slipping disc 279. A third friction disc (not shown) is a ring and is made of felt and is wedged between the fifth slipping disc 279 and the sixth disc 280.

Ring 281 is rotatable supported on second shaft 256. Second cantilever 282 is fixed at ring 281. Spring 283 is located between third stopper 286 and second cantilever 282 and pushes second cantilever 282 towards the side of receiving driving gear 275. Third slipping clutch 284 includes fifth slipping disc 279, sixth disc 280 and the friction clutch.

Sixth disc 280 is pushed towards the side of fifth slipping disc 279 by spring 283 to second cantilever 282. Receiving idle gear 285 is rotatable supported on the end of second cantilever 282. Receiving idle gear 285 engages with receiving driving gear 275.

When first cantilever 272 and second cantilever 282 pivot on second shaft 256, idle gear 273 and receiving idle gear 285 can be engaged with gear 287 is located at unit section 115 of safe 2. When second shaft 256 rotates in the counterclockwise direction as shown in FIG. 15, second spring 270 becomes smaller in diameter because second spring 270 has contact with second shaft 256. Therefore one way clutch is connected. As a result, first pusher 268 rotates towards the same direction.

Second slipping disc 264 rotates towards the same direction by first pusher 268. Therefore first slipping disc 263 is rotated towards the same direction at a predetermined torque which is installed in the first slipping clutch 262. In this situation, first cantilever 272 rotates toward the same direction therefore idle gear 273 engages with gear 287.

Fourth slipping disc 277 rotates the same direction to first stopper 260. Sixth disc 280 rotates in the same direction to third stopper 286, spring 283 and second cantilever 282. Therefore receiving driving gear 275 rotates in the counterclockwise direction and the torque is installed in second slipping clutch 278 and third slipping clutch 284.

Receiving idle gear 285 doesn't engage with gear 287 because second cantilever 282 rotates in the clockwise direction. Therefore gear 287 rotates in the counterclockwise direction at the FIG. 2.

Rollers 124 and 125 are rotated in the counterclockwise direction by gear 287 through to belts 127 and 128. The lowest bank note 12 has contact with rollers 124 and 125 and it is ejected to the outside of safe 2.

When second shaft 256 rotates in the clockwise direction as shown in FIG. 15, second spring 270 becomes larger in diameter because the inner surface of second spring 270 has friction contact with second shaft 266. Therefore the one way clutch is disconnected as a result the drive gear 261 doesn't rotate. Idle gear 273 doesn't engage away from gear 287 because first cantilever 272 rotates in the clockwise direction as shown in FIG. 15.

Receiving driving gear 275 rotates in the same direction towards second slipping clutch 278 and the third slipping clutch 284. At the same time, the receiving idle gear 285 engages with gear 287 because the second cantilever 282 rotates in the same direction. Therefore gear 287 rotates in the clockwise direction as shown in FIG. 2.

Rollers 124 and 125 are rotated in the clockwise direction by gear 287 through belts 127 and 128. Rollers 124 and 125 can draw bank note 12 into safe 2 because they rotate in the clockwise direction. Therefore rollers 124 and 125 can be a let off device 3 or a receiving device 99 depending on the rotating direction. Drawing device 152 includes rollers 124 and 125 and drive changing device 274.

Driving device 288 of package dispensing device 53 is explained. As shown in FIG. 2, guiding roller 57 is rotated by third motor 289. Driving device 288 is third motor 289.

The layout of the sensors is explained, first bank note sensor 291 is located at the outside of shutter 299. Second sensor 292 is located at receiving slot 19. Third sensor 293 is located at first transporting path 301. Fourth sensor 294 is located at the section of fourth roller 55. Fifth sensor 295 is located at reject transporting roller 74. Sixth sensor 296 is located at bank note dispensing slot 5. Seventh sensor 297 is located at recycling passage 7.

The distance between the first sensor 291 and the third sensor 293 is the same length as a bank note 12. Length sensor 298 includes first sensor 291 and third sensor 293. The second sensor 292 is a transparent photoelectric method sensor and has the function of a passing sensor and also a double bill sensor. Checking sensor 302 is the second sensor 292. The bank note sensor could be changed to a reflecting type or mechanical type.

Position sensor 303 detects a first projection 304 and a second projection 305. As shown in FIG. 13, position sensor 306 is a proximity sensor and detects a lifted guide rod 313.

Figure 17:
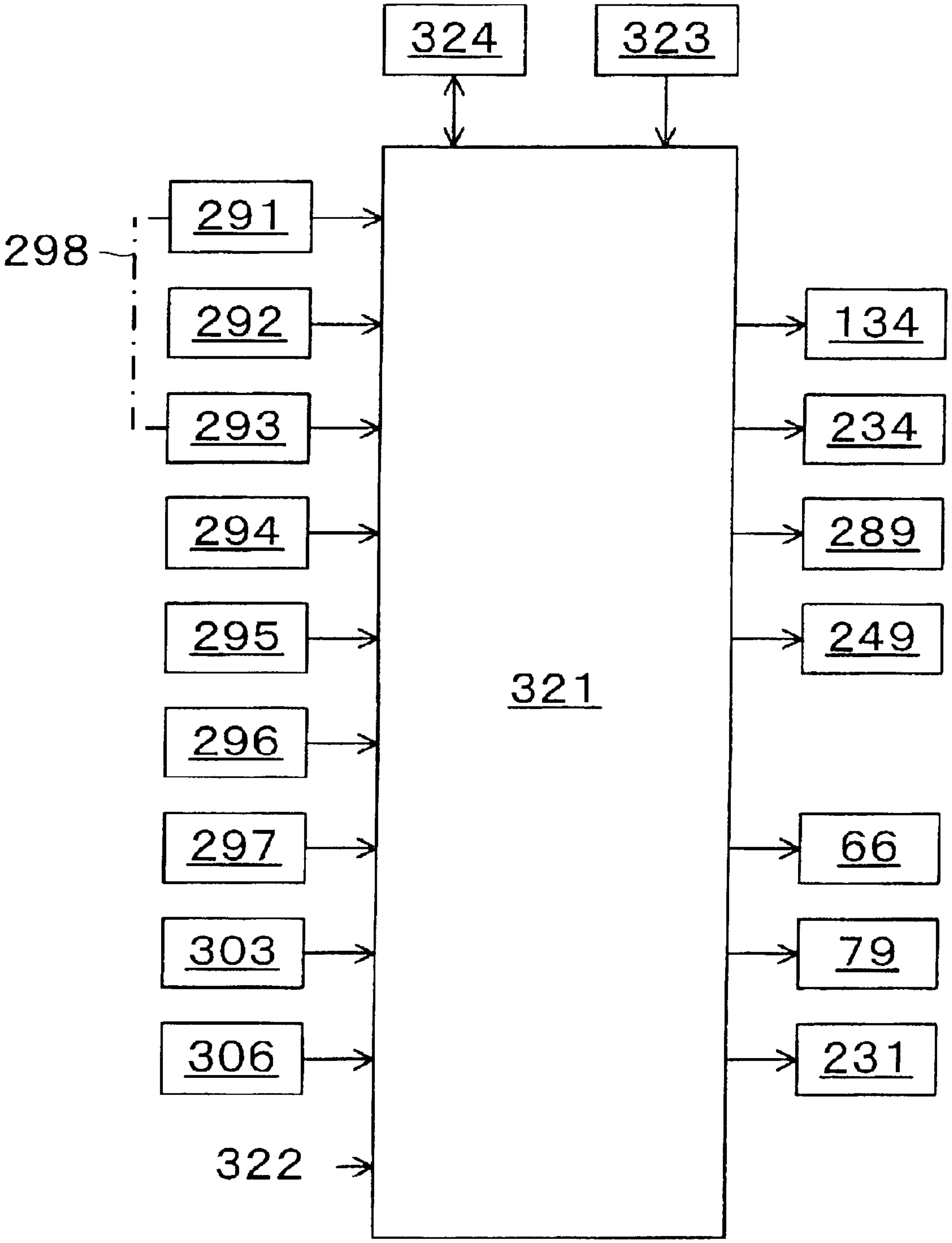
FIG. 17 is a control block diagram of the present invention.

Next, a control block diagram is explained by referring to FIG. 17. Bank note sensors 291 through to 303, position sensor 303 and 306 are connected to a micro computer 321. The payout signal 322 from an exchanger is input to micro computer 321.

Micro computer 321 operates based on a program stored in ROM 323 and controls first motor 134, second motor 234, third motor 289 fourth motor 249, solenoid 66, second solenoid 79 and third solenoid 231.

Figure 18:
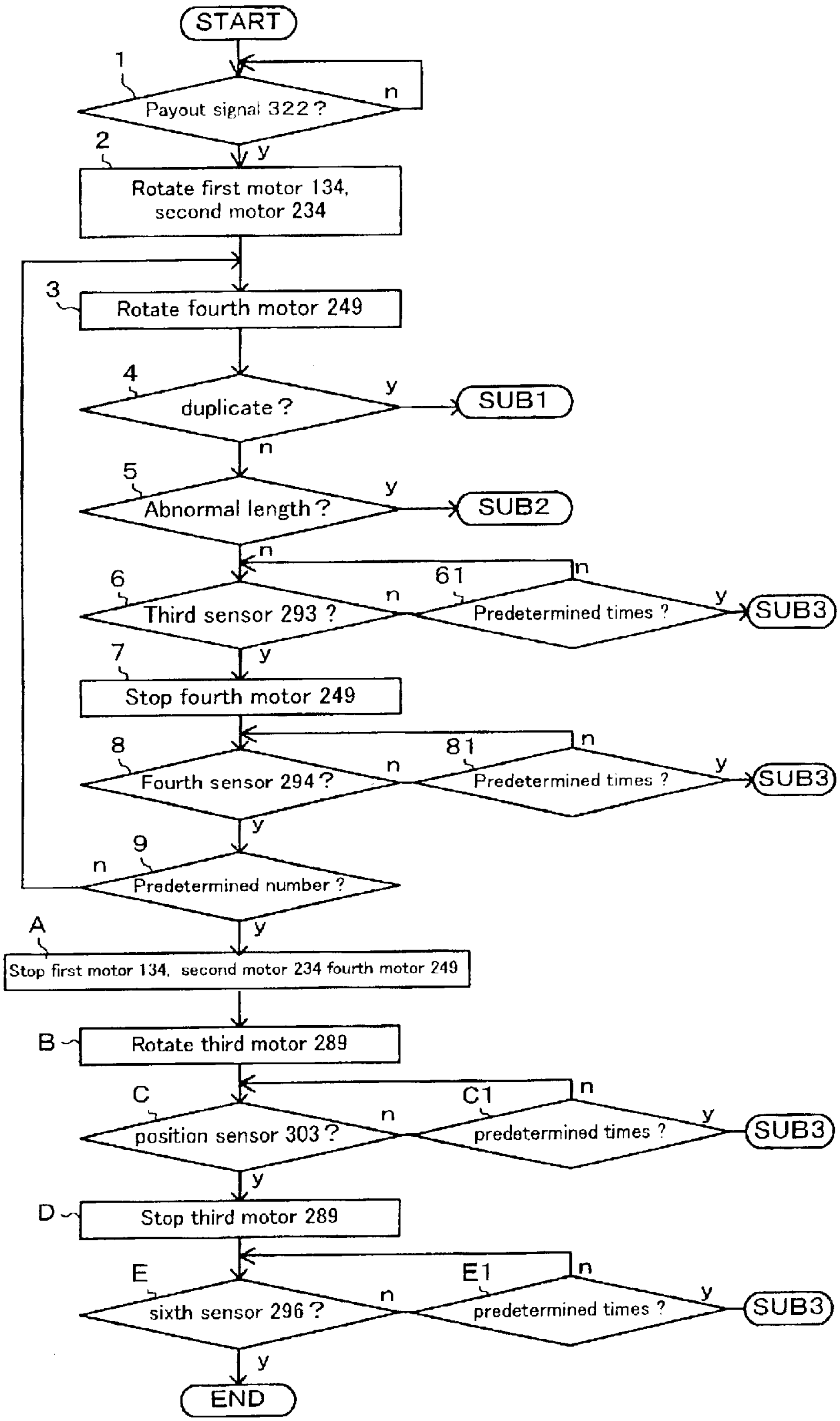
FIG. 18 is a flow chart to explain the operation.
Figure 19:
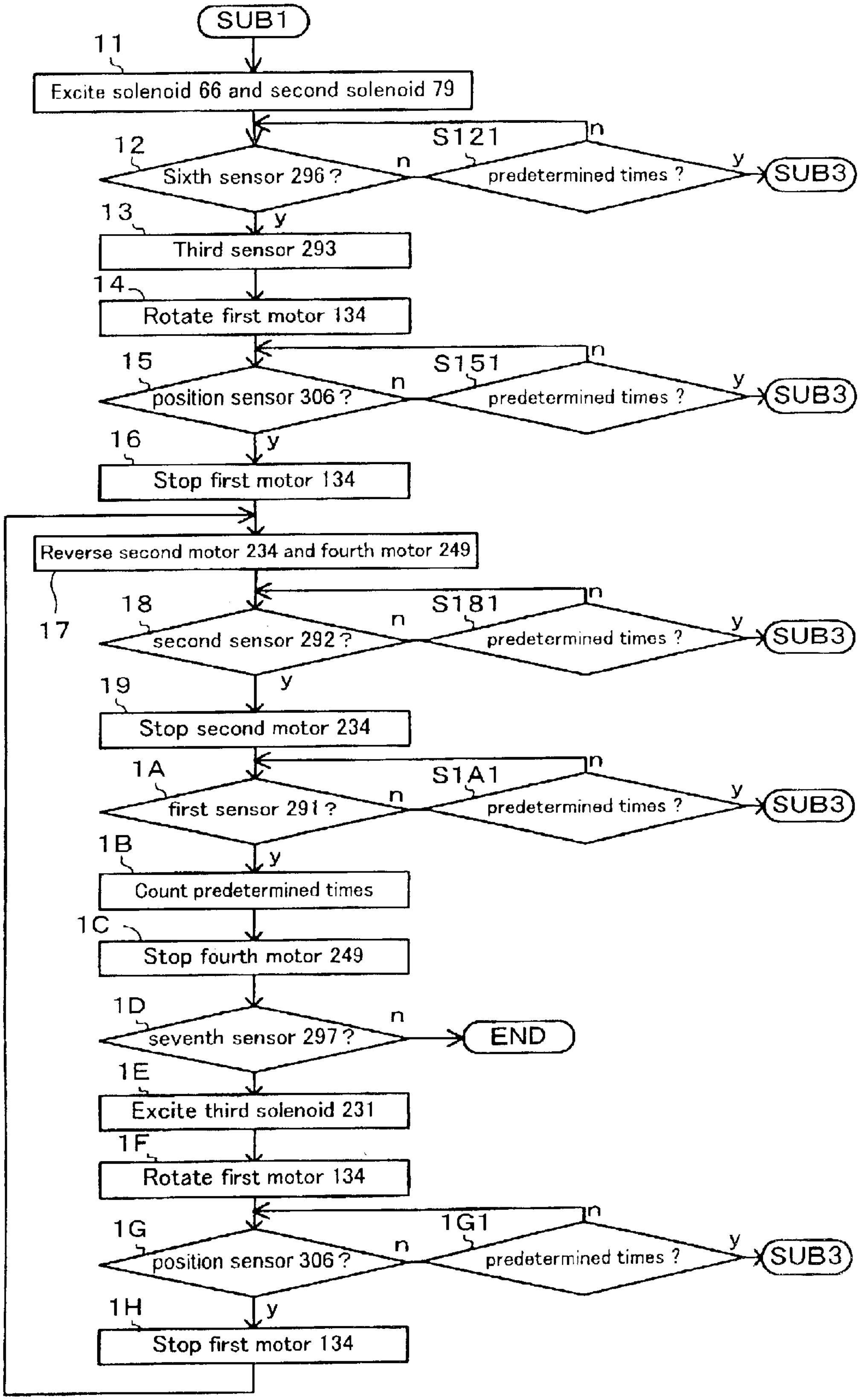
FIG. 19 is a flow chart to explain the operation.
Figure 20:
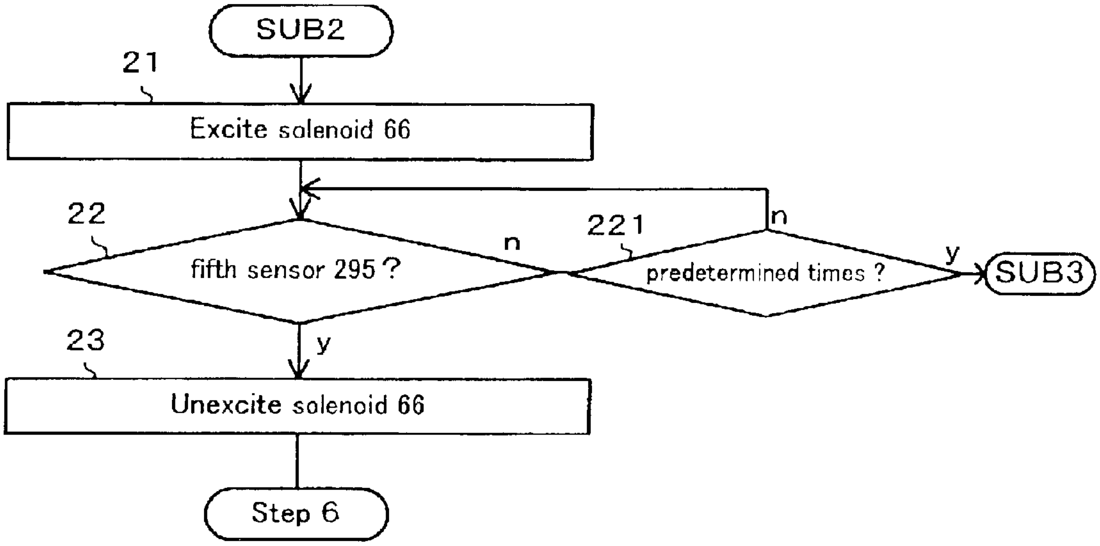
FIG. 20 is a flow chart to explain the operation;.

Next, the operation is explained by referring to FIG. 18 through to FIG. 20. Safe 2 is drawn from storing section 11, and bank notes 12 are stored in storing section 113. Lid 117 is closed and is locked by key 119.

Bank note pusher 129 pushes bank notes 12 to the bottom 157.

The lowest bank note 12 has contact with rollers 124 and 125. Safe 2 is inserted in storing section 11 and is locked to body 10 by a locking device (not shown).

Next the operation, when a bank note 12 is paid out is explained. At step 1, when dispensing signal PO from the control circuit of the vending machine, etc. is checked, it goes to step 2. Therefore first motor 134 and second motor 234 rotate.

When the first motor 134 rotates, second roller 25 rotates in the clockwise direction through a first transmission mechanism 135 and a second gear 26. First arraying roller 41, third roller 28, fourth transporting roller 51, fifth roller 76 and second arraying roller 83 are rotated in the same direction by second gear 149.

First transporting roller 13, first arraying roller 41 and fourth roller 55 rotate and bank note 12 is released to second storing device 52. Reject transporting roller 74 rotates to move the bank note 12 to reject storing section 114.

Second arraying roller 83 rotates for sending the bank note 12 to recycle storing device 73. First gear 22 is rotated in the clockwise direction by second motor 234 through second transporting mechanism 212. Therefore first roller 21 rotates for sending a bank note 12 to the first transporting roller 18.

At step 3, fourth motor 249 rotates. Second shaft 256 is rotated in the counterclockwise direction as shown in FIG. 15 by fourth motor 249 through the third worm gear 252, third worm wheel 254, the pinion gear 255 and the gear 257.

Second spring 270 is rotated by second shaft 256 which rotates in the counterclockwise direction, and screws second shaft 256 up tight, as a result, and second slipping disc 264 rotates. First slipping disc 263 is rotated to the predetermined torque through the friction disc.

First cantilever 272 and first pusher 268 are rotated in the counterclockwise direction by second shaft 256. Therefore idle gear 273 engages with driven gear 126 in unit section 115. In this situation, second cantilever 282 rotates in the same direction by the rotation of counterclockwise direction of second shaft 256. Receiving idle gear 285 doesn't engage with driven gear 126.

Roller 124 and 125 are rotated in the counterclockwise direction by driven gear 126 through belts 127 and 128.

The lowest bank note 12 is sent to bank note exit 123 by roller 124 and 125.

Only one bank note 12 passes through bank note exit 123 and is transported to receiving slot 19. The bank note 12 is transported to first transporting passage 33 by second transporting roller 23 through first transporting roller 13 and it arrives to first arraying device 36.

Bank note 12 is transferred from second transporting roller 23 to first arraying roller 41, shortly after the bank note 12 derails from second transporting roller 23. First arraying roller 41 pushes at a predetermined force a bank note 12 to first guiding board 34. Cylindrical section 44 and slanting section 45 on first arraying roller 41 have contact with bank note 12, when it deforms.

Bank note 12 which moves upward as shown in FIG. 5 is turned in the clockwise direction, because it is guided by first arraying roller 41 and first guiding board 34. The contact pressure of cylindrical section 44 on bank note 12 is larger than the contact pressure of slanting section 45, as a result, the bank note 12 receives a turn force by cylindrical section 44. The lower end of side edge 325 of bank note 12 has contact with third guide wall 38.

The bank note 12 is turned in the clockwise direction as it fulcrums about the lower end. Therefore the side edge length of bank note 12 has contact with third guide wall 38. Afterwards, side edge 325 of bank note 12 is guided by third guide wall 38 and arrives at third transporting roller 27. After bank note 12 is nipped by third transporting roller 27, it goes off from first arraying roller 41. At the third transporting roller 27, the running direction of bank note 12 is changed to a right angle by third press roller 29 and fourth press roller 31.

At step 4, first sensor 291 distinguishes between the overlap of bank notes 12. The output signal of second sensor 292 which is a transmission type is compared to a standard level. As a result, any dispensed double bank notes 12 is detected. When a dispensed double bank notes 12 is detected, the program goes to step 11 of subroutine SUB1. When dispensed double bank notes 12 are not detected, the program goes to step 5, and the length of bank note 12 is judged.

The distance between first sensor 291 and third sensor 293 is slightly longer than the length of bank note 12. Therefore if first sensor 291 and third sensor 293 output the detecting signal at the same time, it is an abnormal situation, and as a result the program goes to step 21. If it is a normal situation, the program goes to step 6.

At step 6, the signal of bank note 12 of third sensor 293 is judged. In other words, when dispensed bank note 12 from safe 2 is detected, the program goes to step 7. At step 7, fourth motor 249 is stopped, as a result, the let off of bank note 12 from safe 2 is stopped.

At step 61, when the bank note signal is detected over a predetermined time period, the program goes to step 31 because jamming may be occurring.

Figure 21:
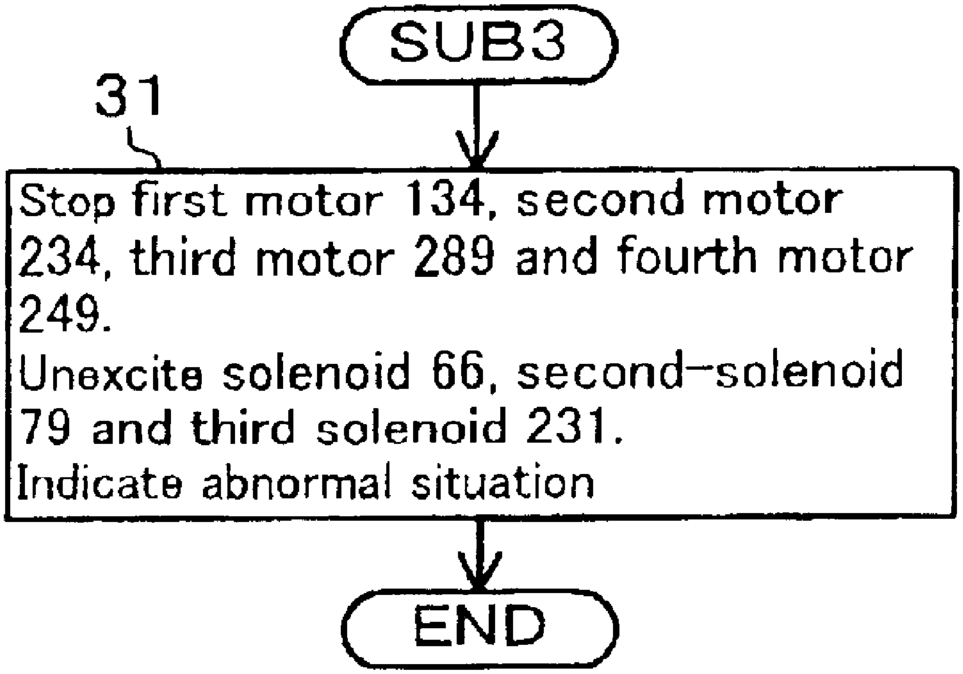
FIG. 21 is a flow chart to explain the operation.

At step 31, all actuators (first motor 134 and second motor 234 etc.) are stopped as shown in FIG. 21, and an abnormal sign is displayed to a visual display, and all control processes are stopped.

Next, at step 8, the bank note detecting signal of fourth sensor 294 is determined. When a bank note detecting signal is not received, it is a normal situation and the program goes to step 9. At step 8, when the bank note signal is detected over a predetermined time period, the program goes to SUB3 because jamming is occurring or at least an abnormal process.

If it is a genuine bank note, diverting board 65 is kept at the solid line. Therefore the bank note is guided to fourth roller 55 by diverting board 65 while wedged between fourth press roller 31 and third roller 28. Second roller 25 transports the bank note 12 to checking sensor 302 which is located between hollow 56 of tray 50 and second transporting device 15.

At step 9, the bank note signal which is outputted from fourth sensor 294, is counted until the predetermined number is reached and the program then goes to step A. In other words, bank notes 12 are stored in a predetermined number in a second storing device 52. If the bank note signal is not a predetermined number, the program returns to step 3 and a second bank note 12 is dispensed from safe 2. This process is repeated until predetermined numeral is reached.

At step A, first motor 134, second motor 234 and fourth motor 249 are stopped. As a result, let off device 3, body 10 and storing device 16 stop.

At step B, third motor 289 rotates. Guiding roller 57 is rotated in the counterclockwise direction as shown in FIG. 2. At step C, when position sensor 303 detects second projection 62, the program goes to step D. At step C, third motor 289 stops, and the program goes to step E.

At step C, when sensor 10 doesn't output the second projection 62 detecting signal within a predetermined time period, it is identified at step C1. At step C1, the program goes to subroutine SUB3 and it executes the trouble shooting. The bank notes 12 in second storing device 52 are moved to bank note dispensing slot 5, as a result the end of the bank notes 12 protrudes from between guiding board 63 and 64.

At step E, when sixth sensor 296 detects the bank notes 12, the program goes to the next step. As a result, the program is stopped. If sixth sensor 296 doesn't detect the bank notes 12 at step E, the program goes to subroutine SUB3. As a result, the program executes a trouble shooting procedure.

The protruding bank note 12 from guiding board 63 and 64 are removed by the user. When the bank notes 12 are not pulled by person while with a predetermined time period, a alarm can be sounded.

When overlapping bank notes 12 are detected at step 4, solenoids 66 and second solenoid 79 are excited at step 1 of subroutine SUB1. Diverting board 65 is slightly pivoted in the clockwise direction by solenoid 66 at step 1 and closes the passage to fourth roller 55 and opens the passage to recycling passage 7. Also, reject guiding board 78 is slightly pivoted in the clockwise direction by second solenoid 79 and closes the passage to reject transporting roller 74 and opens the passage to recycling passage 7.

Therefore bank note 12 is guided by diverting board 65 and is guided by reject guiding board 78. While bank note 12 is wedged between third roller 28 and fourth press roller 31 and the bank note 12 arrives at second arraying device 72. Recycling bank note 80 is pushed to reverse surface 95 by spring 98 at second arraying device 72, afterwards it is wedged between second arraying roller 83 and reverse surface 95.

Recycling bank note 80 is wedged between second arraying roller 83 and reverse surface 95, and passes between third roller 28 and fourth press roller 31. Recycling bank note 80 is changed to a new position by second arraying roller 83 and first arraying roller 41 and the side is pushed to first guiding wall 84 and is arrayed.

Therefore the end of recycling bank note 80 is stopped by the overlap section 107 which is located between fixed rollers 103 and 104 and seventh press roller 102, as a result, recycling bank note 80 is stored in recycle storing device 73. In this situation, second arraying roller 83 has contact with the upper section of recycling bank note 80, however second arraying roller 83 can not be rotated because friction clutch 94 slips.

Therefore recycling bank note 80 is not injured by the rotation of second arraying roller 83, because the transfer of torque of friction clutch 94 is set. Also, the bank note 12 doesn't become wave shape.

In this situation, spring 98 pushes the upper section of recycling bank note 80 to the first guiding board reverse side 67.

When next recycling bank note 80 is transported to recycle storing device 73 while recycling bank note 80 is stored at recycle storing device 73, the end of the next recycling bank note 80 is guided to the root of spring 98 by the slanting surface 97 of spring 98 (shown in FIG. 4). The end of recycling bank note 80 is guided by the slant of spring 98 and has contact with the stored recycling bank note 80 from the side of safe 2. Therefore the next recycling bank note 80 is pushed to the stored recycling bank note 80 by the end of spring 98.

The next recycling bank note 80 is arrayed by second arraying roller 83 and third guiding wall 86. In this manner, recycling bank note 80 is arrayed at the safe 2 side.

At step 12, when bank notes 12 are extracted from bank note dispensing slot 5, the output of sixth sensor 296 becomes "ON" and the program goes to step 13. If sixth sensor 296 outputs the bank note detecting signal over predetermined time period at step 121, the program goes to subroutine SUB3 and executes an abnormal program response.

At step 3, third solenoid 231 is excited. Therefore core 204 moves to the right (shown in FIG. 14), as a result, cam board 194 slides in the same direction.

Slanting section 206 of cam hole 203 pushes up shaft 202 in the elongate hole 193 by the slide of cam board 194. Pinion gear 192 engages with driven gear 189 and driving gear 227.

At step 14, first motor 134 rotates. Crank 186 of lifting driver 155 is rotated by first motor 134, therefore pushes down pin 187 and lever 182. Lever 182 pivots in the counterclockwise direction shown in FIG. 13 and pushes down pin 179.

Transferring base 178 moves upwards and at the same time first pushing rod 173 is guided by bush 171, second pushing rod 174 is guided by bush 172 and guiding rod 177 is guided by bush 176.

When transferring base 178 moves to our upwards position at step 15, as a result, position sensor 306 does not output a detecting signal, and the program goes to step 16. When position sensor 306 detects a signal over a predetermined time period at step 151, the program goes to subroutine SUB3, because lifting device 154 has not pushed up.

At step 16, first motor 134 stops. Therefore transferring base 178 is located at its most upward position. As a result, first pushing rod 173 pushes up first receiving section 163 of bank notes lifting device 153 and second pushing rod 174 pushes up second receiving section 168.

Figure 22:
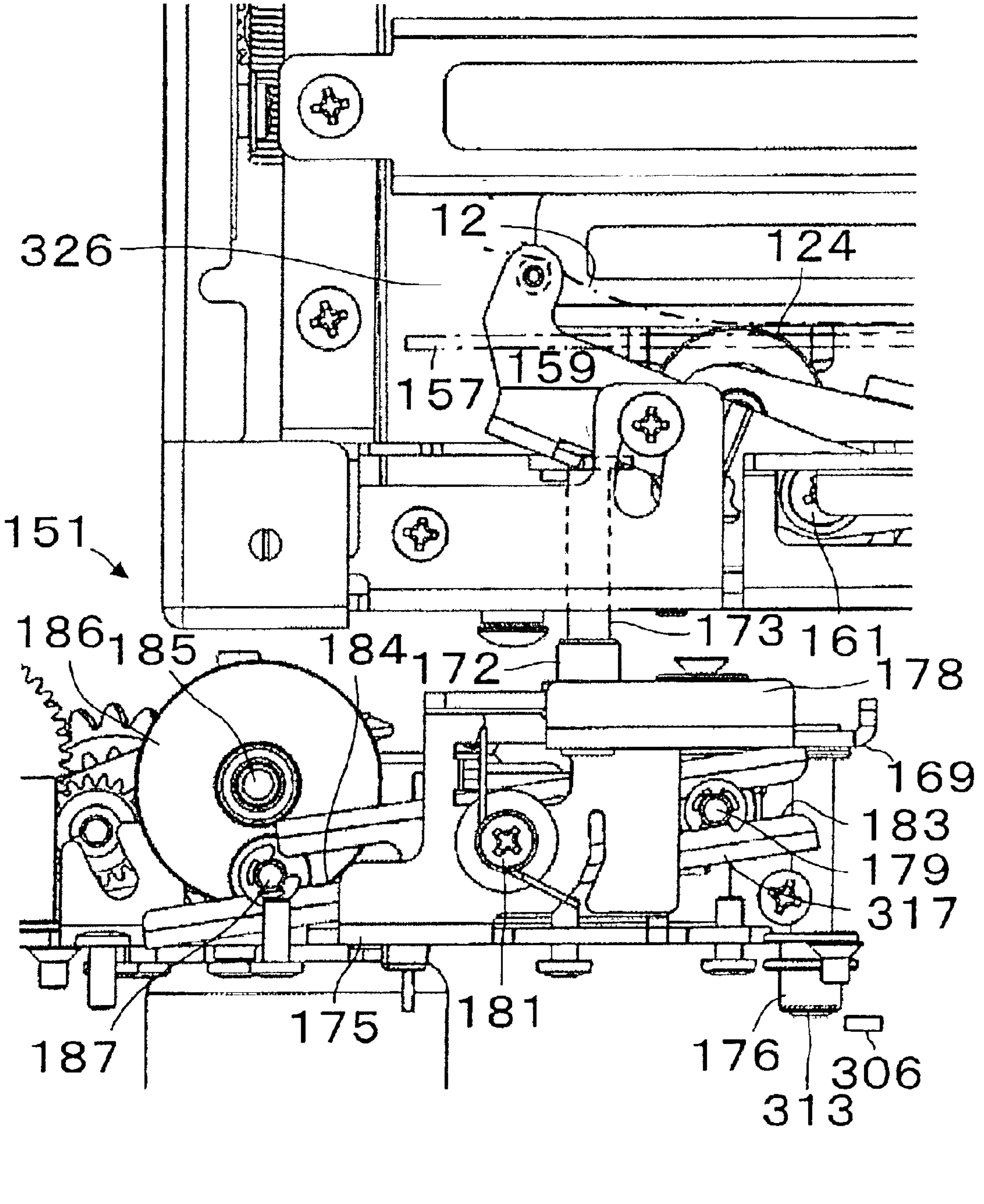
FIG. 22 is a front partial view to explain the operation of the lifting device.

Therefore first lever 159 and second lever 164 pivot in the clockwise direction on each shaft 161 and shaft 165 as shown in FIG. 22 and push upwards each first pin 162 and second pin 166. First pin 162 and second lever 164 push upward bank note 12, therefore they make up the receiving section 326 which has a triangular shape.

At step 17, second motor 234 and fourth motor 249 reverse rotation. First roller 21 rotates in the counterclockwise direction by second motor 234 through second transporting mechanism 212 and first gear 22.

Figure 9:
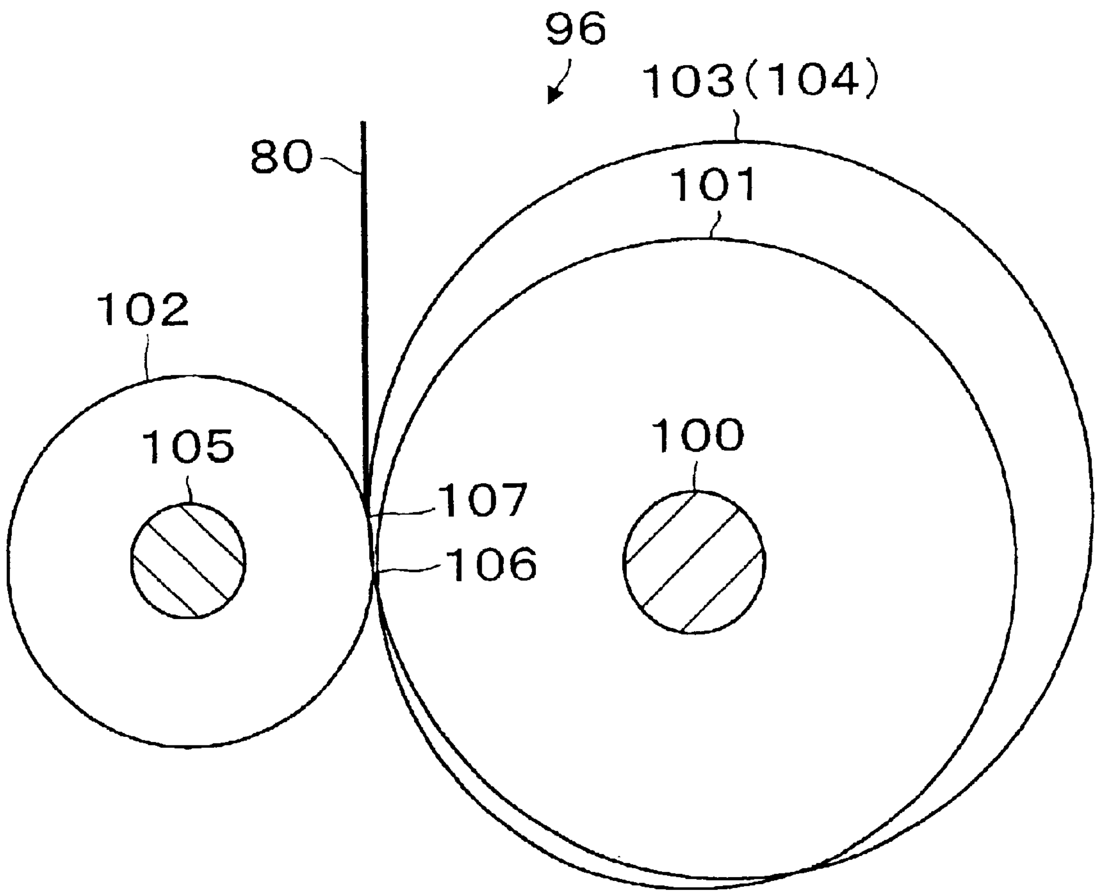
FIG. 9 is an overview schematic diagram of the one by one let off device.

Driving shaft 112 rotates in the counterclockwise direction through gear 243, idle gear 246 and gear 245 by fourth motor 249 as shown in FIG. 8. Therefore the diameter of the spring of the one way clutch 111 shrinks to contact with driving shaft 112. As a result, one way clutch 111 lets in the clutch and rotates shaft 100 in the same direction. Roller 101 rotates in the counterclockwise direction by shaft 100 as shown in FIG. 9.

Seventh press roller 102 has contact with roller 101 and rotates in the clockwise direction. Therefore only recycling bank note 80 which has contact with seventh press roller 102 is pulled down and is let off towards the side of first transporting roller 13 by roller 101.

The recycling bank note 80 is guided to the points of contact between first roller 21 and first pressing roller 20 by the guiding board, and is guided to bank note exit 123 through receiving slot 19. Second shaft 256 rotates in the clockwise direction by fourth motor 249 as shown in FIG. 15.

Therefore idle gear 273 is unengaged from driven gear 126, because first cantilever 272 rotates in the clockwise direction. Also, spring 269 is increased to the inner diameter for rotation of second shaft 256, therefore drive gear 261 does not rotate.

Receiving idle gear 285 engages with driven gear 126, because second cantilever 282 is pivoted in the clockwise direction by second shaft 256. Therefore receiving driving gear 275 rotates in the clockwise direction by the predetermined torque which is set up by second slipping clutch 278 and third slipping clutch 284. Rollers 125 and 126 rotate in the clockwise direction through receiving idle gear 285, driven gear 126, belts 127 and 128 as shown in FIG. 2.

Therefore the end of recycling bank note 80, which is transported from bank note exit 123 to storing section 113 by first transporting roller 13, goes between roller 124 and the bank note 12 passes through receiving section 326. Recycling bank note 80 is transported between roller 125 and bank note 12 by roller 124 is transported.

Therefore the end of recycling bank note 80 is stopped by lid 117, as a result, roller 124 and 125 stops the rotation, because the rotating resistance of roller 124 and 125 increases and second slipping clutch 278 and third slipping clutch 284 slips. As a result, recycling bank note 80 does not receive any damage and is not undulated by rollers 124 and 125.

When second sensor 292 does not detect the bank note signal at step 18, the program goes to step 19. If second sensor 292 does not output the bank note signal within a while predetermined time period at step 181, the program goes to subroutine 3. At step 19, second motor 234 stops.

Therefore, one by one dispensing device 96 and first transporting roller 13 stop their operation.

When first sensor 291 does not detect bank note 12 at step 1A, the program goes to step 1B. At step 1A1, if first sensor 291 does not detect a bank note signal within a predetermined time period, the program goes to subroutine SUB3.

At step SUB3, a trouble shooting procedure is initiated.

At step 1B, after a predetermined clocking, the program goes to step 1C therefore fourth motor 249 stops. As a result, receiving device 99 operates with enough time while recycling bank note 80 is stored in storing section 113.

At step 1D, when seventh sensor 297 detects a recycling bank note 80, the program goes to step 1E. In other words, when there is recycling bank note 80 at recycle storing device 73, it is prepared to receive it. When there isn't recycling bank note 80 at recycle storing device 73, the program finishes.

At step 1E, third solenoid 231 is excited, next first motor 134 rotates at step 1F. When position sensor 306 does not detect guiding rod 177 at step 1G, first motor 134 stops at step 1H. When a signal of position sensor 306 is not detected within a predetermined time period, the program goes to subroutine SUB3 at step 1G, and does trouble shooting.

Therefore lifting device 154 and bank notes lifting device 153 move downwards, and move upwards. As a result, receiving section 326 is formed between the lowest recycling bank note 80 and bottom 157. At step 17, other recycling bank notes 80 are stored in safe 2.

When payout signal 322 is outputted, first the lowest recycling bank note 80 which has contact with roller 124 and 125 is let off from the safe 2.

When length sensor 298 detects any abnormal length of a bank note 12 at step 5, the program goes to step 21 of subroutine SUB2 and solenoid 66 is excited. Therefore diverting board 65 slightly pivots in the clockwise direction and closes the passage to fourth roller 55 and opens the passage to recycling passage 7 as the dotted line shown in FIG. 2.

At this situation, second solenoid 79 is not excited. Therefore reject guiding board 78 closes the passage to recycling passage 7 and opens the passage to reject transporting roller 74. Abnormal length bank note 12 is guided to recycling passage 7 by diverting board 65.

The bank note 12 is guided to reject transporting roller 74 by reject guiding board 78 and is transferred to reject transporting roller 74 while it is transported by third roller 28 and fourth press roller 31. The bank note 12 is transported from receiving slot 121 to reject storing section 114 by reject transporting roller 74, therefore any abnormal length bank note 12 is stored in reject storing section 114.

When the output signal of fifth sensor 295 does not change with a predetermined time period at step 22, the program goes to subroutine SUB3 after it does trouble shooting. When fifth sensor 295 outputs the bank note nothing signal at step 22, solenoid 66 is not excited at step 33. Therefore, diverting board 65 goes back to the solid line position shown in FIG. 2. Next the program goes to step 6.

If a pair of bank notes 12 are misaligned, the bank notes 12 are judged to be in an abnormal situation at each step 4 and 5. However, duplicate judge step takes priority at step 4.

This present invention can store recycling bank note 80 at recycling passage 7, and at next payout timing, the bank notes are let off to first transporting roller 18 in a one by one procedure. In this situation, a second double detecting sensor is located between one by one dispensing device 96 and first transporting roller 18.

Also, this present invention can directly transport recycling bank note 80 to first transporting roller 18 by the one by one dispensing device 96.

This present invention can directly transport bank note 12 from diverting device 6 to bank note dispensing slot 5.

Those skilled in the art will appreciate that various adaptions and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A bank note dispensing device comprising:

a safe which stores bank notes and has a dispensing slot;

a bank note let off device located in the safe for contacting the stored bank notes;

a transport device for transporting the bank notes from the let off device to the dispensing slot;

a monitoring unit which monitors the bank notes to be dispensed;

a diverting device for directing the bank note, in response to an abnormal condition signal from the monitoring unit, to a recycle passageway;

a recycling device for transporting a bank note in the recycle passageway to the let off device; and a direction changing device to change a transportation direction of the let off device to enable the bank note in the recycle passageway to be reinserted in the safe through the let off device.

2. The bank note dispensing device of claim 1, wherein the recycling device includes a lifting device to separate the bank notes from the bottom of the safe.

3. The bank note dispensing device of claim 1, wherein the recycling device includes a receiving device which transports bank notes from the recycle passageway to the safe.

4. The bank note dispensing device of claim 1, wherein the monitoring device determines if two bank notes are being simultaneously dispensed.

5. The bank note dispensing device of claim 1, wherein the recycle passageway is located between the transporting device and the safe.

6. In a dispensing device for storing bank notes in a storage unit and dispensing bank notes to a user through a discharge slot, the improvement of:

a safe for storing bank notes;

a let off device for selectively removing bank notes from the safe;

a transporting unit for transporting a bank note to be discharged along a first passageway to the discharge slot;

a monitor unit operatively positioned relative to the first passageway to monitor a condition of the transported bank note;

a first diverting unit operatively connected to the monitor unit to remove a bank note from the first passageway when the monitor unit indicates a duplicate bank note; and a recycling unit for receiving the duplicate bank note along a second passageway to return the duplicate bank note to a position for subsequent transportation to the let off device to enable storage of the duplicate bank note in the safe through the let off device.

7. The dispensing device of claim 6, wherein the monitor unit monitors a bank note characteristic indicative of a false bank note, and a second diverting unit operatively connected to the monitor unit for diverting the false bank note to a reject storage area.

8. The dispensing device of claim 6, wherein the recycling unit aligns the bank notes.

9. The dispensing device of claim 6, further including a storage tray adjacent the discharge slot for storing bank notes until a predetermined number of bank notes are accumulated in the storage area.

10. The dispensing device of claim 9, further including a second transporting unit to dispense the predetermined number of bank notes accumulated in the storage tray to the discharge slot.

11. The dispensing device of claim 6, further including an arraying device to align the bank notes in the first passageway.

12. A bank note dispensing device comprising:

a storage unit for storing bank notes;

a let off device for removing a bank note from the storage unit;

a first transporting unit for transporting the bank note from the let off device towards a dispensing slot;

a second transporting unit for transporting the bank note from the first transporting unit to the dispensing slot;

a first diverting device between the first transporting unit and the second transporting unit to divert bank notes;

a recycling passageway is positioned adjacent the first diverting device to receive diverted bank notes and return the diverted bank notes to the let off device;

a second diverting device adjacent the recycling passageway;

a monitor unit for monitoring the transported bank notes; and a reject storage unit operatively positioned adjacent the second diverting device for storing rejected bank notes.

13. The bank note dispensing device of claim 12, wherein the monitor unit includes a plurality of sensors that indicates at least one of a duplicate removal of bank notes by the let off device and a bank note characteristic of a false bank note.

14. The bank note dispensing device of claim 13, wherein the monitor unit activates the first diverting device when a duplicate bank note is detected and activates the second diverting device when a false bank note is detected.

15. A bank note dispensing device to provide a user bank notes through a dispensing slot comprising:

a safe which stores bank notes which are stacked up;

a bank note let off device located in the safe for contacting the stored bank notes and selectively removing a bank note from the safe;

a first transporting device which transports the bank notes parallel to the stacked up direction in the safe and is located adjacent the safe;

a monitoring unit which monitors the bank notes to be dispensed and is located adjacent the first transporting device;

a diverting device which directs a bank note in response to an abnormal condition signal from the monitoring unit to either a recycle passageway or the first transporting device, the recycle passageway is located between the first transporting device and the safe;

a recycling device for transporting a bank note in the recycle passageway; and a second transporting device which transports the bank notes towards an extending direction of the stored bank notes which pass through the diverting device, transports the bank notes to the dispensing slot and is located near and parallel to the safe.

16. The bank note dispensing device of claim 15, the safe includes a reject storing section which is located opposite the dispensing slot, and a reject diverting device for diverting the reject bank notes to a reject storing section located at the recycle passageway.

17. The bank note dispensing device of claim 15, the monitoring unit is a length sensor including two sensors which are located at the first transporting device and are spaced at a distance which is shorter than the length of the bank note.

18. The bank note dispensing device of claim 15, the second transporting device is a package dispensing device.

19. The bank note dispensing device of claim 18, the package dispensing device includes a tray which is located parallel to the stored bank notes in the safe; a belt which is located parallel to the tray at a predetermined distance and moves towards the dispensing slot, and a projection member which is fixed along the outer surface of the belt.

20. A bank note dispensing device comprising:

a safe which stores bank notes and has a dispensing slot;

a bank note let off device located in the safe;

a transporting device for transporting the bank notes to the dispensing slot;

a monitoring unit which monitors the bank notes to be dispensed;

a diverting device for directing a bank note, in response to an abnormal condition signal from the monitoring unit, to a recycle passageway; and a recycling device for transporting the bank note in the recycle passageway to the transporting device, the recycling device includes a device to separate the bank note from the bottom of the safe.

21. A bank note dispensing device comprising:

a safe which stores bank notes and has a dispensing slot;

a bank note let off device located in the safe;

a transporting device for transporting the bank notes to the dispensing slot;

a monitoring unit which monitors the bank notes to be dispensed;

a diverting device for directing a bank note, in response to an abnormal condition signal from the monitoring unit, to a recycle passageway; and a recycling device for transporting the note in the recycle passageway to the transporting device, the recycling device includes a lifting device to separate the bank note from the bottom of the safe.

22. A bank note dispensing device comprising:

a safe for storing a plurality of bank notes in a stack including a let off device operatively positioned to contact and remove a bank note from the plurality of stacked bank notes through an opening in the safe that transmits a bank note from the stack;

a transport system for transporting a bank note from the let off device to a position to be dispensed to a user;

a monitoring unit which monitors the dispensed bank notes to determine if more than one bank note has been inadvertently dispensed from the let off device when activated in a mode to dispense one bank note; and a control unit for responding to a signal from the monitoring unit of more than one bank note being inadvertently dispensed, the control unit activating the transport system to return the inadvertently dispensed bank note to operatively engage the let off device and activating the let off device to engage the inadvertently dispensed bank note and reinsert the inadvertently dispensed bank note in the stack through the let off device.

* * * * *